US006999657B2

(12) United States Patent
Walt

(10) Patent No.: US 6,999,657 B2
(45) Date of Patent: Feb. 14, 2006

(54) HIGH DENSITY OPTICAL DATA STORAGE

(75) Inventor: David R. Walt, Boston, MA (US)

(73) Assignee: Tufts University, Medford, MA (US)

( * ) Notice: Subject to any disclaimer, the term of this patent is extended or adjusted under 35 U.S.C. 154(b) by 0 days.

(21) Appl. No.: 10/855,958

(22) Filed: May 28, 2004

(65) Prior Publication Data
US 2005/0013536 A1 Jan. 20, 2005

Related U.S. Application Data

(60) Provisional application No. 60/473,460, filed on May 28, 2003.

(51) Int. Cl.
G02B 6/00 (2006.01)
G11B 7/00 (2006.01)
G11B 7/004 (2006.01)
G11C 5/06 (2006.01)

(52) U.S. Cl. .......................... 385/31; 385/19; 385/43; 385/133; 365/64; 365/215; 369/44.37; 369/44.38; 369/112.05; 369/112.27

(58) Field of Classification Search ................ 385/15, 385/19, 31, 39, 43, 49, 52, 133; 365/64, 365/106–119, 215, 216; 369/108, 109.01, 369/109.02, 110.01–110.04, 112.01–112.09, 369/112.1, 112.11–112.19, 112.2, 112.21–112.29, 369/116–119, 121, 44.37, 44.38
See application file for complete search history.

(56) References Cited

U.S. PATENT DOCUMENTS 5,633,972 A * 5/1997 Walt et al. ................. 385/116
6,278,679 B1 * 8/2001 Weiss et al. ................ 369/108

OTHER PUBLICATIONS

Pantano et al., "Toward a near-field optical array", Rev. Sci. Instrum, vol. 68, No. 3, Mar. 1997, pp. 1357-1359.*
Thompson, D.A., and Best, J.S., "The Future of Magnetic Data Storage Technology," *IBM J. Res. Develop.*, vol. 44, No. 3, May 2000, pp. 311-322.
Dvornikov, A.S., and Rentzepis, P.M., "Accessing 3D Memory Information by Means of Nonlinear Absorption," *Optics Communications*, 119 (1995), pp. 341-346.
Parthenopoulos, D.A., and Rentzepis, P.M., "Three-Dimensional Optical Storage Memory," *Science*, vol. 245, Aug. 1989, pp. 843-845.
Hibino, J., et al., "Aggregation Control of Photochromic Spiroyrans in Langmuir-Blodgett Films," *Thin Solid Films*, 210/211 (1992) pp. 562-564.
Parthenopoulos, D.A., and Rentzepis, P.M., "Two-Photon Volume Information Storage in Doped Polymer-Systems," *J. Appl. Phys.*, vol. 68, No. 11, Dec. 1990, pp. 5814-5818.

(Continued)

Primary Examiner—Michelle Connelly-Cushwa
(74) Attorney, Agent, or Firm—Fish & Richardson P.C.

(57) ABSTRACT

A data storage apparatus includes an array of optical fibers. The array has a first end and a second end. The first end of the array includes multiple optical fiber ends, each optical fiber end having an end face adapted for receiving light of a wavelength $\lambda$ into the fiber for conveyance to the second end of the fiber array. The second end of the array includes multiple tapered optical fiber tips, each tapered optical fiber end having a minimum diameter less than $\lambda$. An opaque coating covers a portion of the tapered optical fiber tips. The data storage apparatus also includes a photochromic medium located within a distance $\lambda$ of the second end of the array.

34 Claims, 20 Drawing Sheets

OTHER PUBLICATIONS

Ando, E., et al., "J-Aggregation of Photochromic Spiropyran in Langmuir-Blodgett Films," *Thin Solid Films*, 133 (1985), pp. 21-28.

Mamin, H.J., et al., "High-Density Data Storage Using Proximal Probe Techniques," *IBM J. Res. Develop.*, vol. 39, No. 6, Nov. 1995, pp. 681-699.

Vettiger, P., et al., "The 'Millipede'—More than One Thousand Tips for Future AFM Data Storage," *IBM J. Res. Develop.*, vol. 44, No. 3, May 2000, pp. 323-340.

Betzig, E., and Trautman, J.K., "Near-Field Optics: Microscopy, Spectroscopy, and Surface Modification Beyond the Diffraction Limit," Betzig, E., and Trautman, J.K., "Near-Field Optics: Microscopy, Spectroscopy, and Surface Modification Beyond the Diffraction Limit," *Science*, vol. 257, Jul. 1992, pp. 189-195.

Betzig, E., et al., "Breaking the Diffraction Barrier: Optical Microscopy on a Nanometric Scale," *Science*, vol. 251, Mar. 1991, pp. 1468-1470.

Reddick, R.C., et al., "New Form of Scanning Optical Microscopy," *Rapid Communications*, vol. 39, No. 1, Jan. 1989, pp. 767-770.

Tan, W., and Kopelman, R., "Chapter 13: Nanoscale Imaging and Sensing by Near-Field Optics," *Fluorescence Imaging Spectroscopy and Microscopy*, Xue Feng Wang and Brian Herman, eds., Chemical Analysis Series, vol. 137, pp. 407-475.

Reddick, R.C., et al., "Photon Scanning Tunneling Microscopy," *Rev. Sci. Instrum.*, vol. 61, No. 12, Dec. 1990, pp. 3669-3677.

Pantano, P., and Walt, D.R., "Toward a Near-Field Optical Array," *Rev. Sci. Instrum.*, vol. 68, No. 3, Mar. 1997, pp. 1357-1359.

Guerra, J., et al., "Near-Field Optical Recording Without Low-Flying Heads: Integral Near-Field Optical (INFO) Media," *Jpn. J. Appl. Phys.*, vol. 41, 2002, pp. 1866-1875.

Minh, P.N., et al., "Near-Field Recording with High Optical Throughput Aperture Array," *Sensors and Actuators A*, vol. 95, 2002, pp. 168-174.

Kim, Y-J, et al., "Parallel Recording Array Head of Nano-Aperture Flat-Tip Probes for High-Density Near-Field Optical Data Storage," *Jpn. J. Appl. Phys.*, vol. 40, 2001, pp. 1783-1789.

Lee, M.B., et al., "Nanometric Aperture Arrays Fabricated by Wet and Dry Etching of Silicon for Near-Field Optical Storage Application," *J. Vac. Sci. Technol. B*, vol. 17, No. 6, Nov./Dec. 1999, pp. 2462-2466.

Hosaka, S., et al., "SPM-Based Data Storage for Ultrahigh Density Recording," *Nanotechnology*, vol. 8, 1997, A58-A62.

Terris, B.D., et al., "Near-Field Optical Data Storage," *Appl. Phys. Lett.*, vol. 68, No. 2, Jan. 1996, pp. 141-143.

Pantano, P., and Walt, D.R., "Ordered Nanowell Arrays," *Chem. Mater.*, vol. 8, 1996, pp. 2832-2835.

Slevin, C.J., et al., "Fabrication and Characterisation of Nanometre-Sized Platinum Electrodes for Voltammetric Analysis and Imaging," *Electrochemistry Communications*, vol. 1, 1999, pp. 282-288.

*Near-Field Optics: Theory, Instrumentation, and Applications*, "Chapter 1: Introduction to Near-Field Optics," M.A. Paesler and P.J. Moyer, eds., John Wiley & Sons, Inc., New York, 1996.

\* cited by examiner

304

302

HIGH DENSITY OPTICAL DATA STORAGE

CLAIM OF PRIORITY

This application claims priority under 35 USC §119(e) to U.S. patent application Ser. No. 60/473,460, filed on May 28, 2003, the entire contents of which are hereby incorporated by reference.

TECHNICAL FIELD

This invention relates to data storage, and more particularly to high density optical data storage.

BACKGROUND

Many different devices and methods exist for storing digital data. For example, current, conventional computer hard drives use magnetic read and write heads to store and access information from magnetic regions, called bits, on storage media. Data are physically stored as magnetic grains on stacks of platters. An orientation of the magnetic grain in one direction can represent a "1," and an opposite orientation can represent a "0." Data are digitally stored on the magnetic storage medium when a read/write head determines the orientation of the grains as bits.

Magnetic storage devices have been used for many years, and the density of bits stored per surface area of the storage medium has increased over time. However, the continued increase of storage density of magnetic media will soon reach physical limitations such as magnetic grain size resistant to thermal self-erasure, difficulty in setting head-to-disk spacings, and switching-speed limitations. Although the evolution of magnetic disks has progressed rapidly, physical phenomena will slow the process that has, in the past, continually increased storage density. A problem arises from the storage medium, whose grain size cannot have a diameter much lower than ten nanometers without thermal self-erasure. Other problems involve head-to-disk spacings that approach atomic dimensions and switching-speed limitations between the head and medium.

Several alternatives to magnetic storage have been proposed, including photochromic-based devices and memories and probe-based data storage. For example, researchers have demonstrated a bit-oriented 3D optical memory system based on a two-photon process using a photochromic spirobenzopyran. See e.g., Dvornikov et al., Opt. Commun., 119:341 (1995); Parthenopoulos et al., Science, 24:843 (1989); and Parthenopoulos et al., Appl. Phys., 119:341 (1990). In this system, two light beams were used to access a point in a volumetric recording medium to write and read data. Two groups have shown that spiropyrans could be used as media for wavelength-multiplexed memory systems. See Hibino et al., Thin Solid Films, 210/211:562 (1992); and Ando et al., Thin Solid Films, 133:21 (1985). Another group used techniques based on atomic force microscopy (AFM) and near-field optics to thermomechanically write on surfaces. See Mamin et al., IBM J. Res. Develop., 39:681–699 (1995). In addition, they compared nitride-oxide semiconductor structures and near-field optical storage to AFM-based storage as potential methods for high-density data storage. A different group used an array of AFM probes to thermochemically store and read back data in thin PMMA films. See Vettiger et al., IBM J. Res. Develop., 44:323–334 (2000). High data rates are achieved by parallel operation of large two-dimensional AFM arrays.

SUMMARY

The invention includes systems and methods of optically storing and reading data. Data are stored on a storage medium by exposing the medium to light to alter the optical properties of the medium, and data are read by illuminating the storage medium with light to detect if data have been written on the medium. By using very small spots of light, having a diameter smaller than the wavelength of the light used to store and read data, many data bits can be packed into a very small area. Furthermore, multiple bits of data can be stored and/or read in parallel, by using multiple separately controllable light beams to store and/or read the data.

In a first general aspect, a data storage apparatus includes an array of optical fibers. The array has a first end and a second end. The first end of the array includes multiple optical fiber ends, each optical fiber end having an end face adapted for receiving light of a wavelength $\lambda$ into the fiber for conveyance to the second end of the fiber array. The second end of the array includes multiple tapered optical fiber tips, each tapered optical fiber end having a minimum diameter less than $\lambda$. An opaque coating covers a portion of the tapered optical fiber tips. The data storage apparatus also includes a photochromic medium located within a distance $\lambda$ of the second end of the array.

The apparatus may include one or more of the following features. The minimum diameter of the tapered optical fiber tips can be between about 2 nm and about 1000 nm. The minimum diameter of the tapered optical fiber tips can be between about 2 nm and about 300 nm. The minimum diameter of the tapered optical fiber tips can be between about 2 nm and about 100 nm. The opaque coating can be metal, and the metal can be gold, aluminum, silver, or chromium. Optical properties of the photochromic medium can be changed when the medium is exposed to light of wavelength $\lambda$.

The apparatus can further include a light detector array positioned such that the photochromic medium is positioned between the light detector array and the array of optical fibers. The light detector can be a charge-coupled device. The light detector can include pixels. Each pixel of the light detector can be associated with an optical fiber of the array. Each pixel can have an area that is more than 1000 times greater than the area of an associated optical fiber's tapered optical fiber end.

The apparatus can further include an array of mirrors for directing the light into the end faces of the optical fibers at the first end of the array. Each mirror can be positioned and adapted to direct light into a different optical fiber of the array. The mirrors can be movable between a first position for directing the light into an optical fiber of the array and a second position for directing the light away from the fibers of the array.

In another general aspect, the invention features a method of optically storing multiple data bits in parallel, by creating light having a wavelength $\lambda$ and directing light of the wavelength $\lambda$ into first ends of selected individual optical fibers of an array of multiple co-axially arranged optical fiber. The light is conveyed to second ends of the optical fibers, from which the light exits and impinges on a photochromic medium whose optical properties can be altered by light of wavelength $\lambda$. The second tapered ends have a minimum diameter less than $\lambda$ and are positioned within a distance $\lambda$ of the photochromic medium.

The method can include one or more of the following features. For example, the method can further include positioning individual mirrors of an array of multiple mirrors, such that first selected individual mirrors direct the light into the first ends of the individual optical fibers and non-selected individual mirrors do not direct light into the first ends, and shining light of wavelength λ onto the array of multiple mirrors such that the light is reflected by the selected mirrors onto the first ends of individual optical fibers and is conveyed to the second ends of the optical fibers. The method can further include translating the array of optical fibers substantially parallel to a surface of the medium, and again shining light of wavelength λ onto the array of multiple mirrors such that the light is reflected by second selected mirrors onto the first ends of individual optical fibers and is conveyed to the second ends of the optical fibers, where the light exits the optical fibers and impinges on the photochromic medium.

In another general aspect, the invention features a method of optically storing multiple data bits in parallel by positioning individual mirrors of an array of multiple mirrors, such that first selected individual mirrors direct light of wavelength λ into first ends of individual optical fibers of an array of multiple co-axially arranged optical fibers and non-selected individual mirrors do not direct light into the first ends. The individual optical fibers have second tapered ends with a minimum diameter less than λ and are positioned within a distance λ of a photochromic medium whose optical properties is altered by light of wavelength λ. Light of wavelength λ is shined onto the array of multiple mirrors such that the light is reflected by the selected mirrors onto the first ends of individual optical fibers and is conveyed to the second ends the optical fibers, where it exists the optical fibers and impinges on the photochromic medium.

This general aspect may include one or more of the following features. The method can include translating the array of optical fibers substantially parallel to a surface of the medium and again shining light of wavelength λ onto the array of multiple mirrors such that the light is reflected by second selected mirrors onto the first ends of individual optical fibers and is conveyed to the second ends the optical fibers, where it exists the optical fibers and impinges on the photochromic medium.

In a further general aspect, the invention features a method of optically reading multiple data bits in parallel by directing light of a first wavelength $\lambda_1$ into multiple first ends of individual optical fibers of an array of multiple co-axially arranged optical fibers, where the individual optical fibers have second tapered ends having a minimum diameter less than $\lambda_1$ and are positioned within a distance $\lambda_1$ of a photochromic medium whose optical properties can be altered by light of second wavelength $\lambda_2$ that is not equal to $\lambda_1$. An optical property of the photochromic medium representing a digital data bit is measured at a location under each of the second tapered ends of the optical fibers. The measurement of the optical properties is used to determine whether each data bit represents a "1" or a "0."

This general aspect features one or more of the following features. For example, the optical property can be a transmissivity of the medium. The method can further include translating the array of optical fibers substantially parallel to a surface of the medium, again directing light of the first wavelength λ1 into the first ends of individual optical fibers of the array, again measuring an optical property of the photochromic medium representing a digital data bit at a location under each of the second tapered ends of the optical fibers, and again determining whether each data bit represents a "1" or a "0" based on the measurement of the optical properties.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

I. Introduction and Overview

Figure 1:
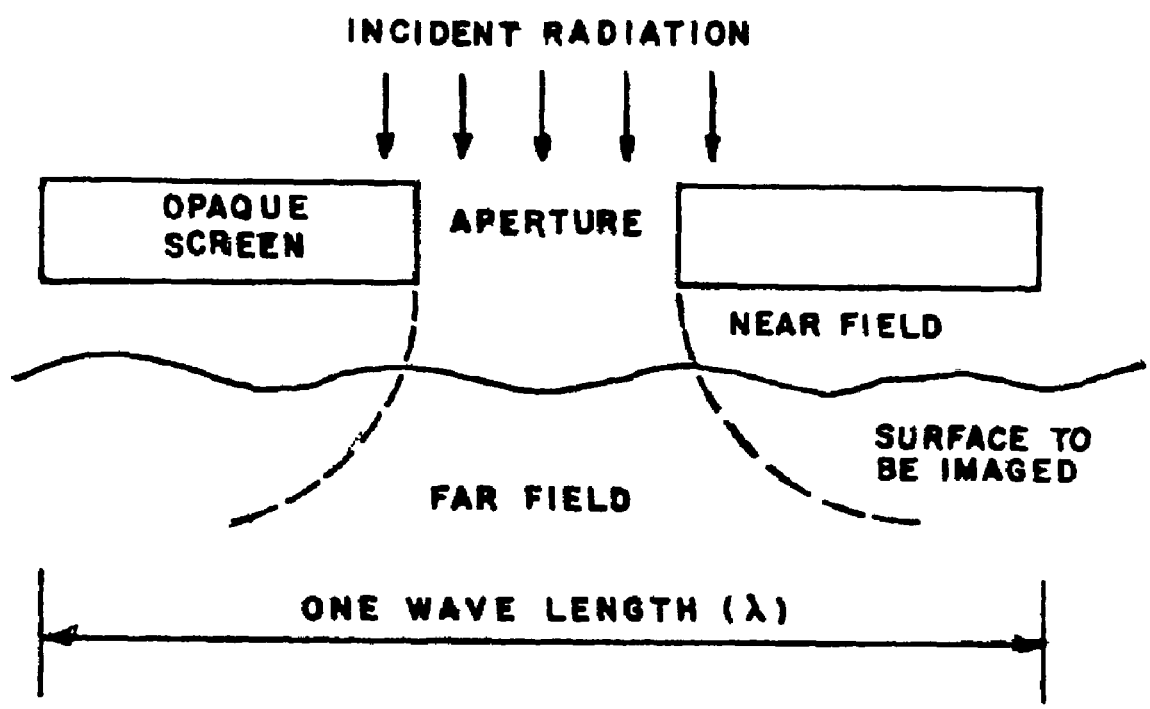
FIG. 1 is a schematic representation of the near-field diffraction from a subwavelength aperture in a conducting medium.

Methods and systems for optically storing information in high density by manipulating the optical characteristics of a photochromic film on the nanometer-scale are disclosed. In particular, an array of multiple near-field optical fiber probes having nanometer-sized tips for emitting light are disclosed and described. Such small tips can be used for directing light onto a photochromic film and changing the transmission or reflective properties of the film. In addition, many thousands of probes can be assembled into an array of probes, and each probe of the array can detect, or read, the optical changes in the film. Because the size of the tips is thousands of times smaller than the size of the optical fiber itself, each tip can be used to change the optical properties of the photochromic film in thousands of separate locations within the area of each optical fiber. With the ability to read and write thousands of nanometer-sized spots within an area of each probe, resulting in millions of spots of data for the entire near-field array, each near-field tip of the array can be used as a read/write head, and the array can be used collectively to record a dense amount of data in a small area.

An array of near-field tips acts as an optical read/write head on a photochromic medium when a laser beam is coupled into the near-field tip array and is transmitted from a proximal end to a distal end of a fiber bundle containing the near-field tips. A photochromic medium is placed in close proximity to the near-field tip array. Light of a specific wavelength enters the fiber at the proximal end, travels throughout its length, and exits a nanometer-sized aperture at the distal end and impinges onto the photochromic medium, which acts as an optical storage device. The light emitted from each aperture changes the optical properties of the photochromic medium and represents a bit of data. Analogous to magnetic media, photochromic media also has a binary state in its optical properties. For example, a bit of written data can be represented by writing an opaque spot (a "1") on unwritten, clear photochromic medium (a "0"). A device that simultaneously controls the transmission of laser light through many different individual fibers in the imaging bundle can be used to turn on or off the light in each individual tip. As a result, such a device can determine whether or not data are recorded in a particular probe's region. In this manner, a near-field tip array enables the user to record information in a highly parallel fashion.

Data can be read in a similar parallel fashion. The near-field tip array can read the recorded data if each tip in the array is directly mapped to a pixel in a CCD chip. Each tip can read a particular region of the photochromic medium by interrogating it with laser light. As the tip moves to each region on the photochromic medium, light enters and travels through the fiber and exits the tip. A written region differs from a non-written region by its optical properties; its transmission properties, for example. The detector located under the photochromic medium can then measure the optical change in a particular region where bit information was or was not written.

II. Near-Field Optics

Near-field optics is a branch of optics that has been used to image objects with a resolution better than the wavelength of light used to illuminate the object.

The resolution of all lens-based instruments is defined by the finite dimensions of a lens. The resolving power, or the minimum separation between two points which can be resolved ($d_{min}$), can be approximated by the following equation: $d_{min}=\lambda/2$ where $\lambda$ is the wavelength of light. This limitation is the result of diffraction that takes place in the lens because of the wave nature of light. Moreover, it should be noted that the resolution limit described above arises from the assumption that the image of an object is being detected in the "far-field," that is, a distance which is much greater than the wavelength of light employed (e.g., the wavelength of green light is about 500 nm). For these reasons, where the optical microscopy is so limited in resolution to no better than one-half of the wavelength of light being used ($\lambda/2$), such microscopy is termed "far-field" imaging or viewing.

An increasingly important and rapidly developing alternative to conventional lens-based optical microscopy is the "near-field" or lensless technique that provides superresolution imaging and spectroscopy. The term "superresolution" defines any means for optical imaging or spectroscopy that permits spatial resolution which exceeds the diffraction limitation caused by the wave nature of light; and provides a resolution which is greater than one-half the wavelength of the light actually being used. All superresolution near-field imaging and near-field scanning optical microscopy ("NSOM") (also known as SNOM—mainly in Europe) is based on the fact that although light cannot be focused to a spot less than one-half the wavelength of light ($\lambda/2$), it can be directed through a device or article which reduces the size of the light energy to dimensions smaller than $\lambda/2$. A variety of techniques for reducing the size of the probe have been proposed and applied in near-field imaging and to near-field scanning optical microscopy. For example, devices that use small apertures have been developed (Betzig et al., Science, 257:189–195 (1992); Betzig et. al., Science, 251:1468 (1991); Lewis et al, Ultramicroscopy, 13:227 (1984); Pohl et al., App. Phys. Lett., 44:651 (1984); Betzig et al., Biophys. J., 49:269 (1986)); devices involving near-field scattering mechanisms have been used (Pohl et al., Proc. Soc. Photo-opt. Instru. Eng., 897:94 (1988); Fischer et al., Phys. Rev. Lett., 62:458 (1989); Reddick et al., Phys. Rev. B., 39:767 (1989)); and techniques that depend upon luminescence effects have been used (Lieberman et al., Science, 247:59 (1990); Lewis et al., Nature, 354:214 (1991); U.S. Pat. No. 5,105,605, and U.S. Pat. No. 5,633,972).

The basic principle of near-field viewing and imaging is best illustrated by the aperture technique as illustrated in FIG. 1. When light is directed through a sub-λ-sized aperture, the portion of energy that passes through the hole is at first confined to the dimensions of the aperture. The exiting light being of subwavelength dimensions will then rapidly diffract in all directions. However, there will be a distinct region in the vicinity of the aperture called the "near-field" where the exiting light beam retains the approximate dimensions of the hole. If this subwavelength light beam within the near-field region is used to raster scan the surface of an object, a two-dimensional image can be created in a serial fashion (one point at a time). Resolution far less than the conventional lens-based limit of about 200 nanometers (nm) is easily achieved; and frequently resolution on the order of 15–50 nanometers can be achieved using the NSOM technique.

The essential concept of superresolution near-field imaging was presented more than sixty years ago by E. H. Synge (Phil. Mag., 6:356 (1928)); revisited more than 40 years ago by J. A. O'Keefe (J. Opt. Soc. Am., 15:359 (1956)); and validated in 1972 by an experiment which obtained λ/60 resolution by passing microwaves through a small aperture and scanning the aperture over a surface (Ash et al., Nature, 237:510 (1972)). However, near-field superresolution technique remained only of passing interest for some years thereafter (Lewis et al., Biophys. J., 11:405a (1983); Lewis et al., Ultramicroscopy, 13:227 (1984); Pohl et al., Appl. Phys, Lett., 11:651 (1984)). It has only been in the last few years that near-field imaging and NSOM have regained interest as an alternative technique in optical microscopy (Lieberman et al., Science, 247:59 (1990); Kopelman et al., Microbeam Analysis, (D. G. Howitt, ed.), San Francisco Press Inc., 1991; Lewis et al., Anal. Chem., 63:625A (1991); Betzig et al., Science, 257:189 (1992); and Harris et al., Applied Spectroscopy, 48:14A (1994)).

The most favored approach to date for near-field imaging and NSOM has been the use of apertures and the development of aperture-containing probes that overcome the technological difficulties imposed by the NSOM approach. It is recognized that the main difficulty in near-field imaging and the NSOM technique lies primarily in the fabrication of a suitable aperture and in the ability to position the aperture accurately near the surface of the object to be imaged and yet be close enough to the surface of the object that the subwavelength light beam remains collimated. The entire near-field region typically extends no further than the dimensions of the subwavelength aperture itself. Accordingly, to maintain consistency of light beam size and intensity of light energy, the actual distance between the surface of the object and the subwavelength-aperture must be held constant to within a few percent of the entire near-field region itself.

Several different kinds of subwavelength aperture-containing probes or articles have been developed and reported in the scientific literature. A first instance has taken the form of metal-coated glass micropipettes (Harootunian et al., Appl. Phys. Lett., 19:674 (1986)). These micropipettes were produced by heating and pulling apart small glass capillaries to yield an inner aperture diameter in the range of between 500–1000 Angstroms (A). The heat-pulled glass capillaries are then evaporation coated along the outside of the glass micropipette with a thin film of metal such as aluminum or chrome—thereby making the exterior surface completely opaque. Typically thereafter, a small optical fiber strand is inserted into the interior lumen of the coated glass pipette up to the very tip near the aperture, and a laser beam of light is fed into the pipette interior via the optical fiber. As a consequence, a tiny beam of light energy emerges from the uncoated hole at the tip of the micropipette. In this manner, a controlled subwavelength beam of light energy emitted from the tapered micropipette can be employed for near-field scanning optical microscopy (Betzig et al., Science, 257:189 (1992) and the references cited therein).

Another instance of the aperture technique is the use of a clear optical fiber tapered adiabatically to a tiny tip and subsequently coated with aluminum (Betzig et al., Science, 251:1468 (1991)). Using this subwavelength apertured probe in combination with a light beam from an argon ion laser through an 80 nanometer aperture, near-field images with λ/43 resolution were obtained.

A third instance of aperture probes utilizes crystals of anthracene, dichloromethane, and tetracene to transform the aperture point from a passive source of subwavelength light into an active emitter of light. These articles employ the submicron tip of a metal-coated glass micropipette whose interior is filled with the molecular crystal. Incoming light photons propagate through the submicrometer portion of the pipette and become absorbed by the crystal. The crystal then actively emits the light beam through the aperture for near-field illumination of a sample (Kopelman et al., Microbeam Analysis, (D. G. Howitt, editor), San Francisco Press, Inc., 1991).

A fourth instance utilizes a flat aperture consisting of a glass slide covered with a thick aluminum film containing small subwavelength dimension holes formed by metal-shadowing small latex spheres. (Fischer et al., J. Vac. Sci. Technol., B3:3861 (1985)). The problem of positioning the flat aperture probe in relation to the surface of a sample was resolved by placing a flat sample on the top of a spherical glass surface.

III. Reading and Writing Data with Near-Field Tips on Optical Fibers

Figure 2:
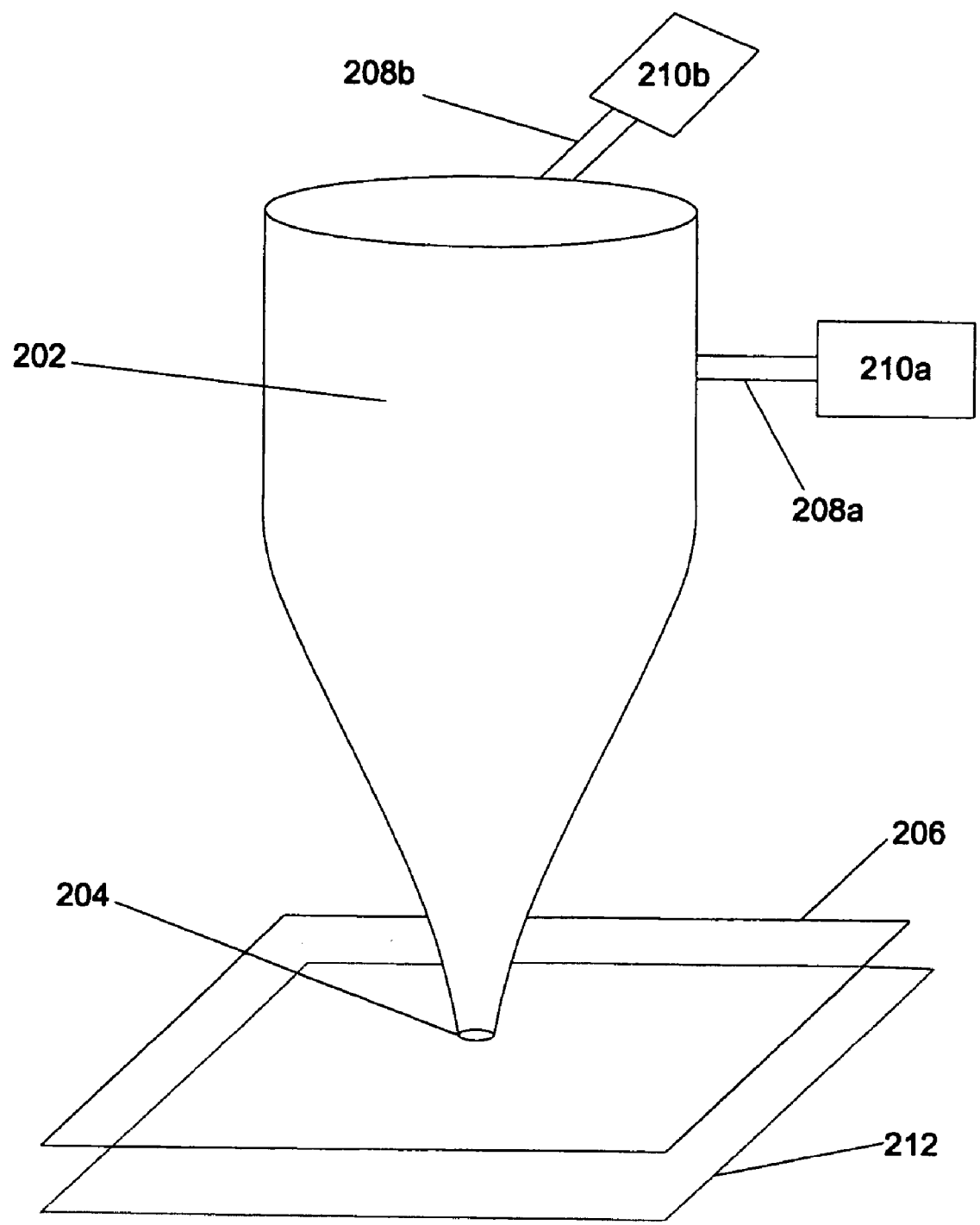
FIG. 2 is a schematic perspective view of tapered optical fiber apparatus for reading and writing data to a photochromic film.

As shown in FIG. 2, data can be written to and read from a photochromic medium such as a photochromic film using near-field optics techniques, similar to those discussed above. Light is injected into the upstream end of an optical fiber 202 and transported through the fiber to the tapered end 204. The tapered end 204 of the fiber 202 has a diameter less than the wavelength of laser light, so that when the laser light is emitted from the tapered end, it diverges rapidly. The tapered tip 204 is located within one wavelength (i.e., within the near-field region) of a sheet of photochromic film 206. Photochromic film 206 can consist of a photochromic dye embedded in a polymer matrix and dried or spin-coated onto a glass slide (not shown). Optical properties of the photochromic film 206 can be altered when exposed to light emitted from tapered tip 204 and having an activating wavelength. For example, if the photochromic film 206 is normally transparent, it can become opaque when exposed to light having an activating wavelength. Because the light is emitted from a very narrow-diameter tip 204 of the optical fiber 202, which is placed close enough to the film 206 to be within the near-field regime, the area of the film over which the optical properties are altered is only about the size of the area of the tip 204. For example, exposing the film to light of a particular wavelength emitted from the tip 204 of fiber optic 202 can change the portion of the film directly under the tip from transparent to opaque. Thus, data bits are written on photochromic film 206 when light of a particular wavelength exits from the tip 204 of the fiber 202.

Figure 3B:
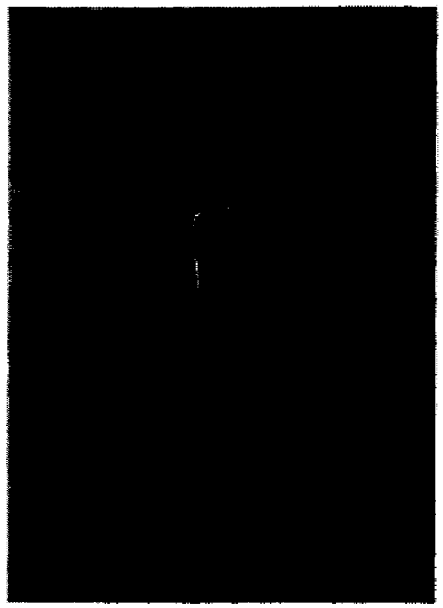
FIGS. 3A and 3B are magnified views of a photochromic film in two different states of transmissivity and graphics of the transmission mission spectra of the film in its two different states.
Figure 3B:
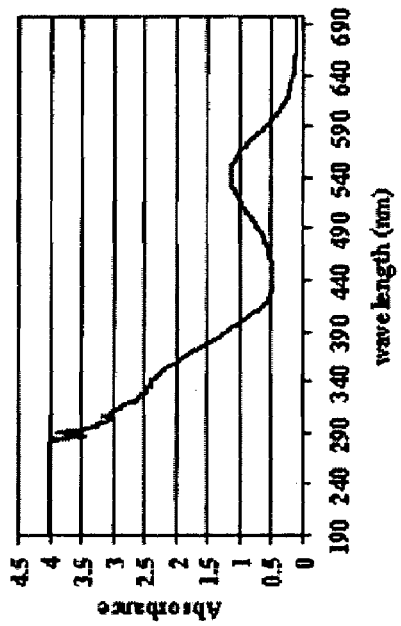
Figure 3A:
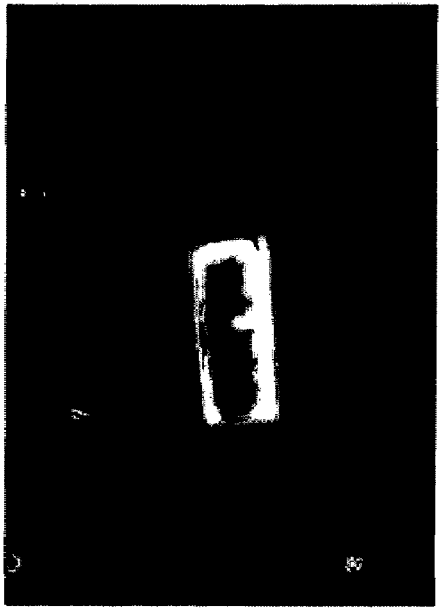
Figure 3A:
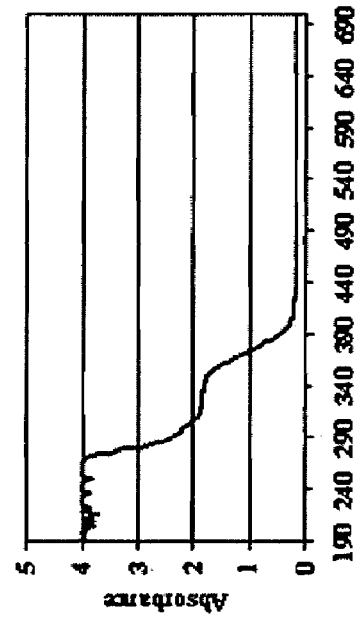

A photochromic medium that has not been exposed to a particular wavelength of light (i.e., unwritten photochromic media) exhibits specific optical properties that can be characterized by the specific transmission spectra 302, 304 shown in FIGS. 3A and 3B. Exposure to light changes the optical properties of the storage medium—changing the clear, unwritten film to an opaque, written film. As a result, the photochromic film exhibits binary-like properties. For example, the spectrum 302 for film in one state (clear film that has not been written) lacks a characteristic peak in the absorption spectrum centered around 540 nm that is present in the absorbance spectrum 304 of film in the other state (film that has been exposed to light and has been "written"). To prepare the film to be written upon, the film can be exposed to ultraviolet (UV) light, which changes the color of the entire film, e.g., to pink, and makes the film opaque to visible light. Thereafter, data spots can be written on the film using 647 nm (red) light, which locally alters the transmissivity of the film and makes the film transparent to visible light. Referring again to FIG. 2, film 206 can use spiropyran as the photochromic indicator. Spiropyran can be synthesized (Choi, Y-K., Kim, E., "Synthesis and Polymerization of 6-(Alkyloxyphenyl)carbonyl Substituted Spirobenzopyran," Tetrahedron Lett., 39 (48): 8861–8864 (1998)) or commercially obtained (e.g., from Sigma-Aldrich, in St. Louis, Mo.). A solution for creating a photochromic film 206 can be prepared from 0.05 g of spiropyran, 0.45 g of polymethylmethacrylate, and 15 mL of chloroform (other solvents, e.g., THF can also be used). This solution can be spin-coated or just dried onto a glass slide (Fisher No. 12-550A) or coverslip (Fisher NO. 12-545C) to create the film 206. In addition to a film of photochromic material 206, other structures of photochromic material can be used to record data. For example, a slab, block, or chip of photochromic material can be used. As shown in FIG. 2, the optical fiber 202 can be translated by the arms 208a and 208b of an x-y translation stage to a new position on film 206, where new data can be written. The movement of each arm 208a, 208b of the translation stage can be controlled by a piezoelectric controller 210, so that the tip 204 of the fiber can be translated with nanometer precision across the film 206. In this manner, multiple bits of data can be written within an area equal to the cross-sectional area of the optical fiber 202, because the area of the tip 204 is much smaller than the cross-sectional area of the fiber. The number of bits that can be written within such an area is roughly equal to the ratio of the area of the fiber 202 to the area of the tip 204.

After data bits have been written to the film 206, they can be read from the film by probing the optical characteristics of the area of the film associated with a data bit. For example, a CCD 212 can be positioned behind the film 206, and light having a wavelength that would be transmitted though a portion of the film that had not been written (i.e., representing a "0") and one which would be absorbed by a portion of the film that had been written (i.e., representing a "1") can be shined on the film. For example, if the absorption spectra 302, 304 of FIGS. 3A and 3B are characteristic of the film 206, an appropriate wavelength for probing the film and reading the data can be 540 nm. If the 540 nm light is transmitted through the film 206 and the CCD 212 detects transmitted light, a "0" is read, and if such light is not transmitted through film 206 and CCD 212 does not detect transmitted light, a "1," is read (see below for further details).

Data bits may be erasable from the film in several ways. All the data bits on the entire film can be erased simultaneously by applying sufficient heat to the film. Alternatively, an individual data bit may be erased by locally shining light of the appropriate wavelength on the bit. For example, if UV light is used to render the film opaque and red light is used to write a data bit on the spot, UV light may be shined though a particular optical fiber onto the data bit to make that portion of the film opaque again. In this manner, the film need not be used as a WORM (write once, read many) storage device, but may be used as a rewriteable device.

IV. The Unitary Fiber Optic Array

An array of optical fibers useful for reading and writing data using near field optical techniques, as described above, is shown in FIG. 4. Many optical fibers, each of which has a tapered tip at one end for optically writing bits of data onto photochromic film, may be collected into a fiber bundle 402 of many individual optical fibers 402 with tapered end tips. Thus, a fiber bundle including an array of read/write heads may be fabricated, such that multiple data bits may be written and read in parallel through the individual optical fibers of the bundle 402 of the bundle.

The unique fiber optic array, its organization and construction, and its component parts are illustrated by FIGS. 4–7. A discrete, unitary fiber optic array 400 is a preformed bundle comprised of a plurality of individually clad, fiber optical strands 402 disposed coaxially along their lengths and has a predetermined overall array configuration and dimensions. The smallest common repeating unit within the preformed array is a single fiber optical strand. A typical fiber bundle may comprise between 1,000 to 100,000 (or more) individually-clad optical fiber strands in which the diameter of each fiber strand disposed within the bundle is on the order of 2–100 micrometers. The manner in which these optical fiber strands are prepared and the manner in which these multiple optical fibers strands are joined collectively into an organized optic array is conventionally known (see, e.g., Walt, U.S. Pat. No. 5,633,972), but are fundamental to and requisite for a proper understanding and use of the construction and format for the fiber bundle and the array of read/write heads.

A fiber optic bundle is illustrated by FIGS. 4–7. The unitary optical fiber array 400 appears in an exaggerated, highly magnified, and simplified view without regard to scale within FIG. 4. The preformed array is composed of a plurality of individually clad, optical fiber strands 402 which collectively lie co-axially along their respective lengths as the discrete, unitary optic array 400 of fixed and determinable configuration and dimensions.

Figure 4:
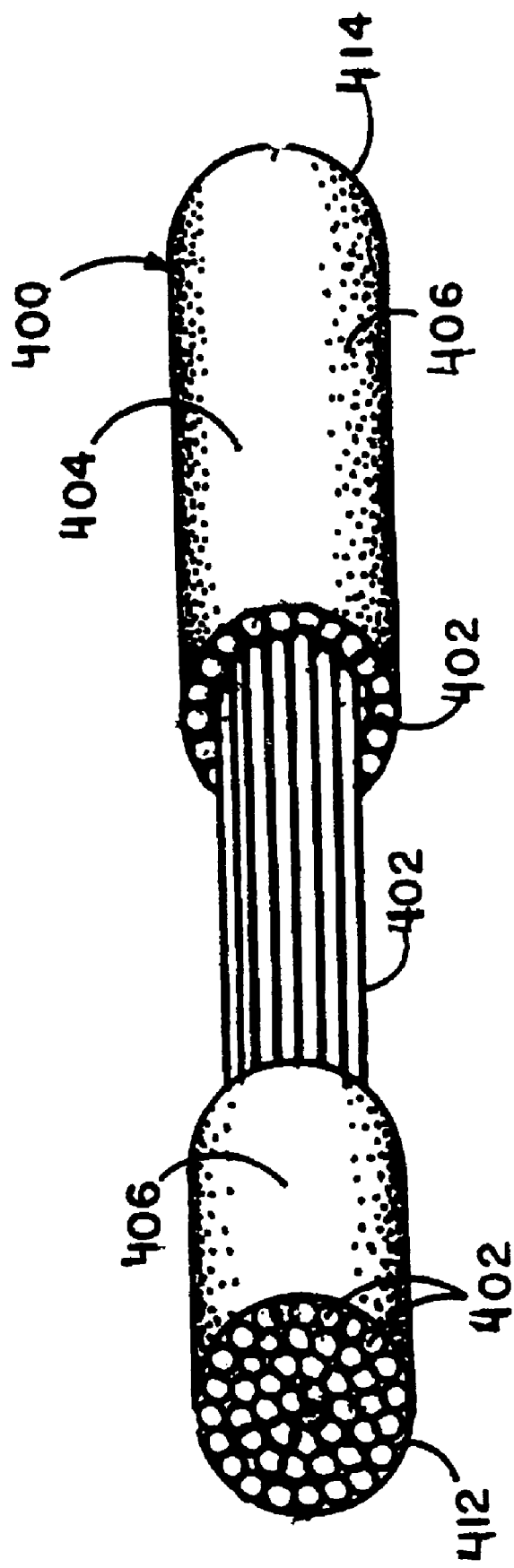
FIG. 4 is a cut-away perspective view of a unitary fiber optic array.
Figure 5:
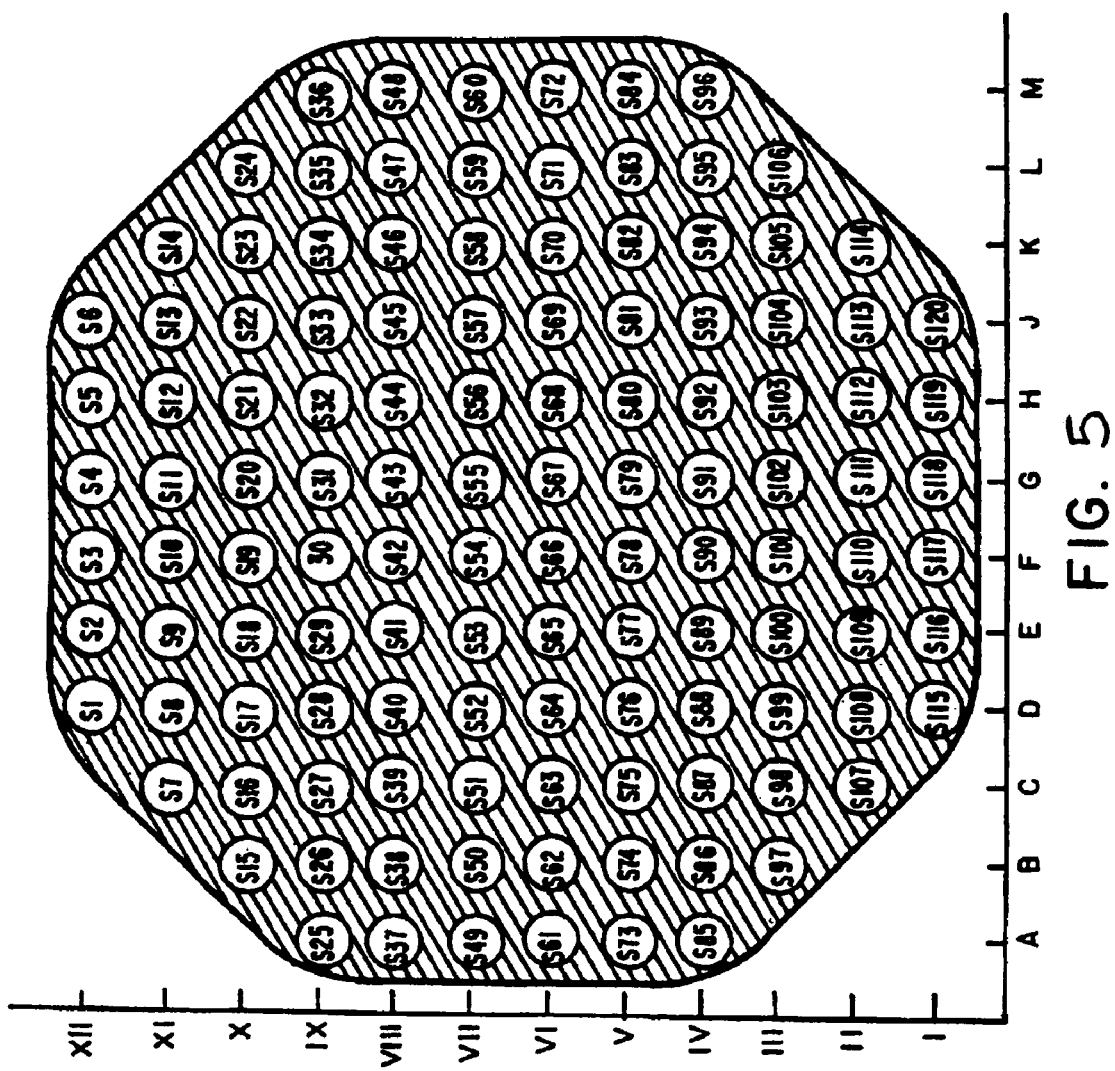
FIG. 5 is a schematic end view of a "proximal" optic array end surface for the fiber optic array of FIG. 4.
Figure 6:
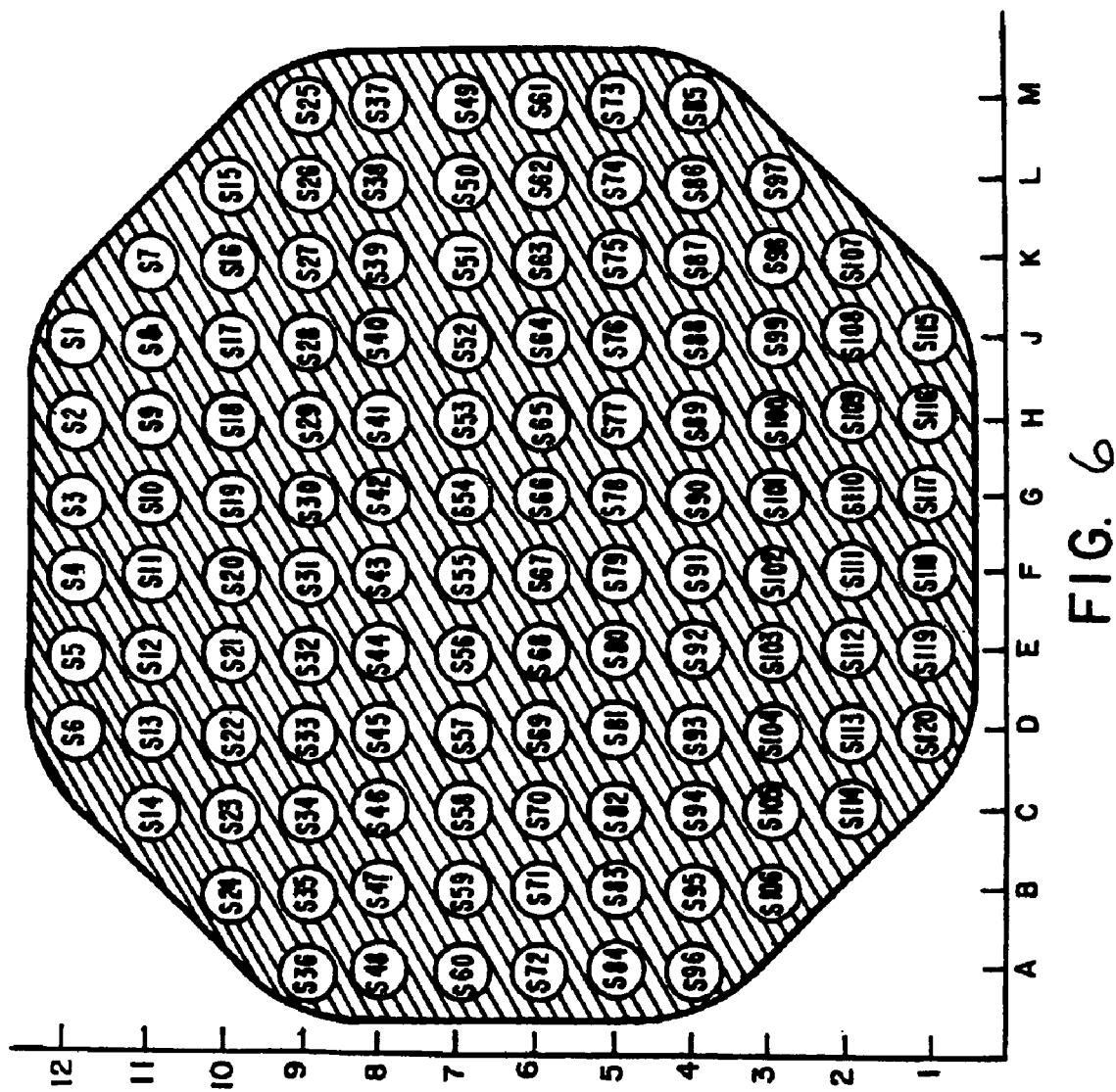
FIG. 6 is a schematic end view of a "distal" optic array end surface for the fiber optic array of FIG. 4.

The construction, organization, and positional alignment within a typical optical fiber unitary array are revealed in FIGS. 4–7. For descriptive purposes only, each of the individually clad, optical fiber strands 402 is presumed to be linearly straight in position and has been arbitrarily assigned an identifying number S1–S120 as illustrated by FIGS. 5 and 6. The intended proximal optic array surface (i.e., the upstream end, where light is inserted into the array) 412 at one end of the fiber bundle 400 depicted in FIG. 5 shows that each of the individual fiber optical strands S1–S120 can be identified and distinguished from its adjacent disposed neighbor as well as from any other optical fiber strand within the preformed array 404 by a set of spatial positioning coordinate numbers for the strand end faces. Thus, the intended proximal optic array surface 412 can be arbitrarily divided into two axial coordinate directions as is illustrated by FIG. 5. The exact location of the S1 strand is thus identifiable by the numerical coordinates "XII D" showing the strand end face. Similarly, the exact spatial positioning and strand end face of the S71 fiber is designated as "VI L." In this manner, the individual spatial position and strand end faces for each optical fiber strand S1–S120 is completely locatable and identifiable using the coordinate numeral labeling system.

The other distal optical array surface (i.e., the downstream end, where light is emitted from the array) 414 at the other end of the optic fiber bundle 400 allows for a similar mode of identification (presuming straight linear alignment of strands) by spatial positioning of each individual optical strand-again as a result of dual axis numerical coordinates as seen in FIG. 6. Accordingly, fiber and strand end face S1 is located at numerical position "12$j$," and fiber S71 is identifiable, locatable, and distinguishable from all other fibers at the optic array surface by its individual numeral coordinates "6$b$." In this manner, the precise and exact position of each individually clad optical fiber strand and strand end faces on each of the discrete optic array surfaces 412, 414 can be located, identified, and specified via a series of two different numerical coordinates. The intended proximal and distal optic array surfaces are thus completely identifiable and distinguishable as per individual fiber optical strand 402 despite its presence in the preformed collective body 406 of the unitary fiber optical array 400.

The preformed overall organization of the individually clad, optical fiber strands 402 within the unitary array 400 is as aligned, parallel strands that maintain their relative organizational positioning in a coherent manner over the entire length of the collective body 406.

However, this high degree of organizational alignment is not an absolute requirement for each and every embodiment of the unitary optical array. Alternative manufacturing practices allow for a more random disposition of the individually clad, optical fiber strands disposed co-axially along their lengths. For example, a partially random disposition or a completely random alignment of the optical fiber strands will also result in a unitary collective body of optical fibers and in proximal and distal collective ends that provide two discrete optic array surfaces. An organized disposition of the individual optical fiber strands is shown in the electron micrograph of FIG. 7.

In such alternative embodiments, however, an optical fiber strand 402 whose intended proximal end would be found to be at numerical position "II J" of FIG. 5 could randomly present a intended distal end position designated as "3$h$" as shown within FIG. 6. It will be recognized therefore that while the individually clad, optical fiber strands lie adjacent one another along the entirety of their axial lengths—their position relative to one another, however, can vary in part or in whole, thereby creating a semi-coherent or an incoherent alignment which will vary in the degree of randomness to be found within their organizational construction. There is no requirement as such that the positioning of the intended proximal end of one strand is aligned and/or identical with the positioning of the intended distal end within the unitary optical array. Thus, in such randomly organized optical array constructions, therefore, the precise proximal and distal end positioning for the strand end faces would be measured and identified by passing light energy through individual optical fibers at one optic array end face and empirically determining the location of the light energy photons exiting from the other end of the same single fiber strand. Although far more laborious and inconvenient, by performing this extra step of empirically coordinating the proximal and distal ends of each individual optical fiber strand in the unitary array, an analogous exact set of numerical coordinates identifying the precise spatial positioning of the fiber at each end of the array can be obtained.

The entirety of the construction for the unitary imaging optical fiber array (whether uniformly coherent, semi-random, or completely randomly organized) provides a means of introducing light energy photons of any determinable wavelength at one specific positioning on the designated "proximal" optic array surface; and then be able to predict accurately the spatial position of the light energy exiting from one or more specific strand ends at the "distal" optic array surface. Therefore, by using a completely coherent and rigidly maintained parallel alignment of strands illustrated by FIGS. 5 and 6 (the intended proximal and distal optic array end surfaces respectively) of a unitary fiber optic array, the user can introduce light energy to a specific spatial location on the "proximal" optic array surface 412—for example, only to fibers S1, S7 and S8—and have accurate knowledge and confidence that the light energy would be conveyed only by those three optical fiber strands and exit only the strand end faces at numerical positions "12$j$," "11$j$," and "11$k$" alone on the "distal" optic array surface 414. No other light energy would appear from any other fiber strand or spatial position at the optic array surface 414.

Similarly, were light energy of specific wavelengths introduced at the "proximal" optic array surface 412 via optical fibers S107, S108, and S115 respectively, the user can accurately predict and identify that the light energy would be conveyed by only these three optical fibers; and would exit as light beams only at the "distal" optic array surface 414 at strand numerical coordinate position numbers "2$k$," "2$j$," and "1$j$" respectively; and from no other strand end faces or spatial positions on this "distal" optic array surface. In this manner, not only does one have knowledge of the individual spatial positioning of each optical fiber strand in the preformed array, but also has the ability to identify and precisely locate light energy photons emerging from individual optical fiber strands within the whole of the optic array surface in a practical and reliable mode.

A. Tapering the Second Optic Array end of the Unitary Fiber Optic Array

Once the preformed unitary fiber optic array is obtained or prepared, it is essential that the designated "distal" or second discrete optic array end be tapered and reduced in thickness such that each optical fiber strand end becomes tapered individually and presents a tapered strand end face limited in size to a range from about 2 nanometers to about 1,000 nanometers in diameter. These tapered multiple strand end faces will therefore collectively present a tapered optic array end surface for the conveyance and discharge of multiple light energy beams concurrently.

A choice and variety of different tapering methods and techniques are available to achieve the desired end result and product of a "distal" optic array end which is tapered, of reduced thickness, and presents individual tapered strand end faces limited in size to a range of about 2–1,000 nm in diameter. The presently available tapering methods include an etching procedure or a combination pulling, heating, and etching procedure. Other methods that achieve similar results can also be used.

1. The Fiber Etching Method

Figure 8:
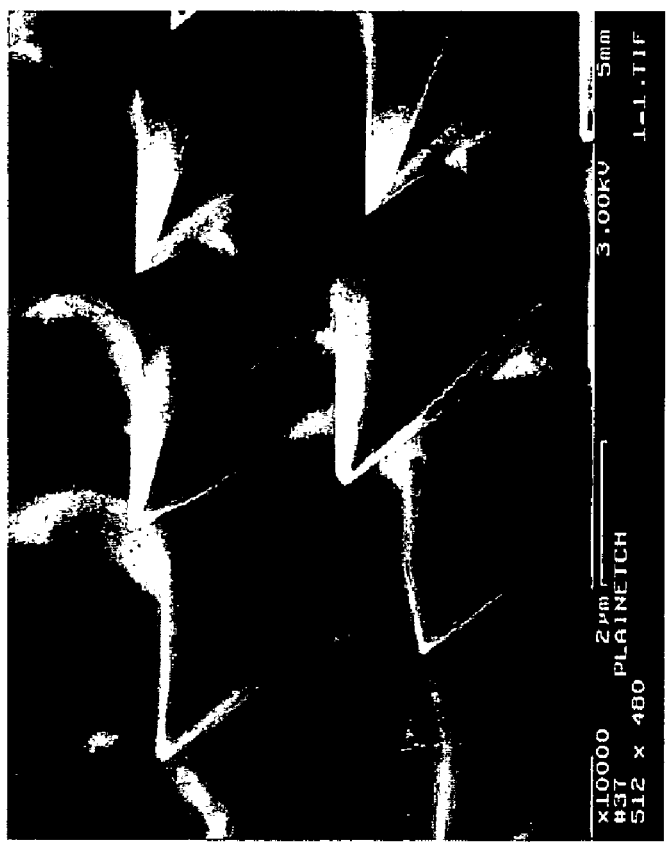
FIG. 8 is a magnified view of an array of tapered tips of individual optical fibers at the distal end of an optic array.
Figure 7:
FIG. 7 is a magnified view of a distal end of an optic array end surface.

An available means for tapering the designated "distal" fiber optic array end utilizes etching procedures to reduce the thickness of each individual optical fiber strand end and to taper the strand end face such that a sharply tapered, pointed strand end tip face is produced, resulting in an array of near-field tips, each tip having a diameter as small as a few nanometers. Arrays comprising up to 100,000 fibers have been prepared, but more fibers could be bundled if desired. Anisotropic etching of the cladding surrounding the individual fibers in the fiber bundle forms the tip (see, e.g., P. Pantano and D. R. Walt, "Toward a Near-Field Optical Array" Rev. Sci. Instrum., 68, 1357–1359 (1997)). Each tip in the array is formed as the cladding of each fiber is removed at a faster rate than the central core. The chemical etching results in an array of tips as shown in FIGS. 7 and 8. Each tip shown in FIGS. 7 and 8 is formed from a 3 micron diameter fiber, but other fiber diameters can be used. The height of each tip is approximately 3 microns. Note also that selective and/or differential etching of an optical fiber strand's core versus the cladding of the strand can be achieved by exploiting either (a) the difference in chemical structure of the strand core and the cladding material, or (b) the difference in the spatial position and thickness of the strand core and the cladding material which surrounds it. For example and as explained by Pangariban et al. (Jpn. J. Appl. Phys., 31:L1302, 1992), the difference in the solubility of the Si-based and Ge-based reaction products following the reaction of $SiO_2$ and $GeO_2$ with a buffered hydrofluoric acid solution leads to the difference in the etching rates between the core and cladding of the optical fiber strands comprising the unitary fiber optic array. Such selective and/or differential etching techniques will result in a faceted optic grid array end whose tapered strand end faces are individually limited in size to the range of about 2–1,000 nm in diameter, but will also provide an array of sharply tapered strand end tips which are spaced from one another by the diameter of a fiber.

Available etching procedures include wet/chemical etching techniques which utilize reactants such as hydrofluoric acid, buffered hydrofluoric reagent mixtures, strong inorganic bases such as sodium hydroxide, and other highly corrosive and disintegrating liquids such as chromic acid and the like (see, e.g., Pangaribuan et. al., Jpn. J. Appl. Phys., 31:L1302–L1304 (1992) and the references cited therein). Alternatively, dry etching techniques utilize and include such processes as magnetron reactive ion etching, focused ion beam milling, chemically-assisted ion beam etching, electron cyclotron etching, inductively coupled plasmas, and the like (see, e.g., Snider et al., J. Vac. Sci. Tech. B., 12:3327–3331, 1994; Marchman et al., J. Vac. Sci. Tech. B., 12:3585–3590, 1994). If desired, one may also employ a dual or combination wet and dry etching procedure with the aid of photolithographic masking techniques conventionally known and utilized to date.

Figure 11:
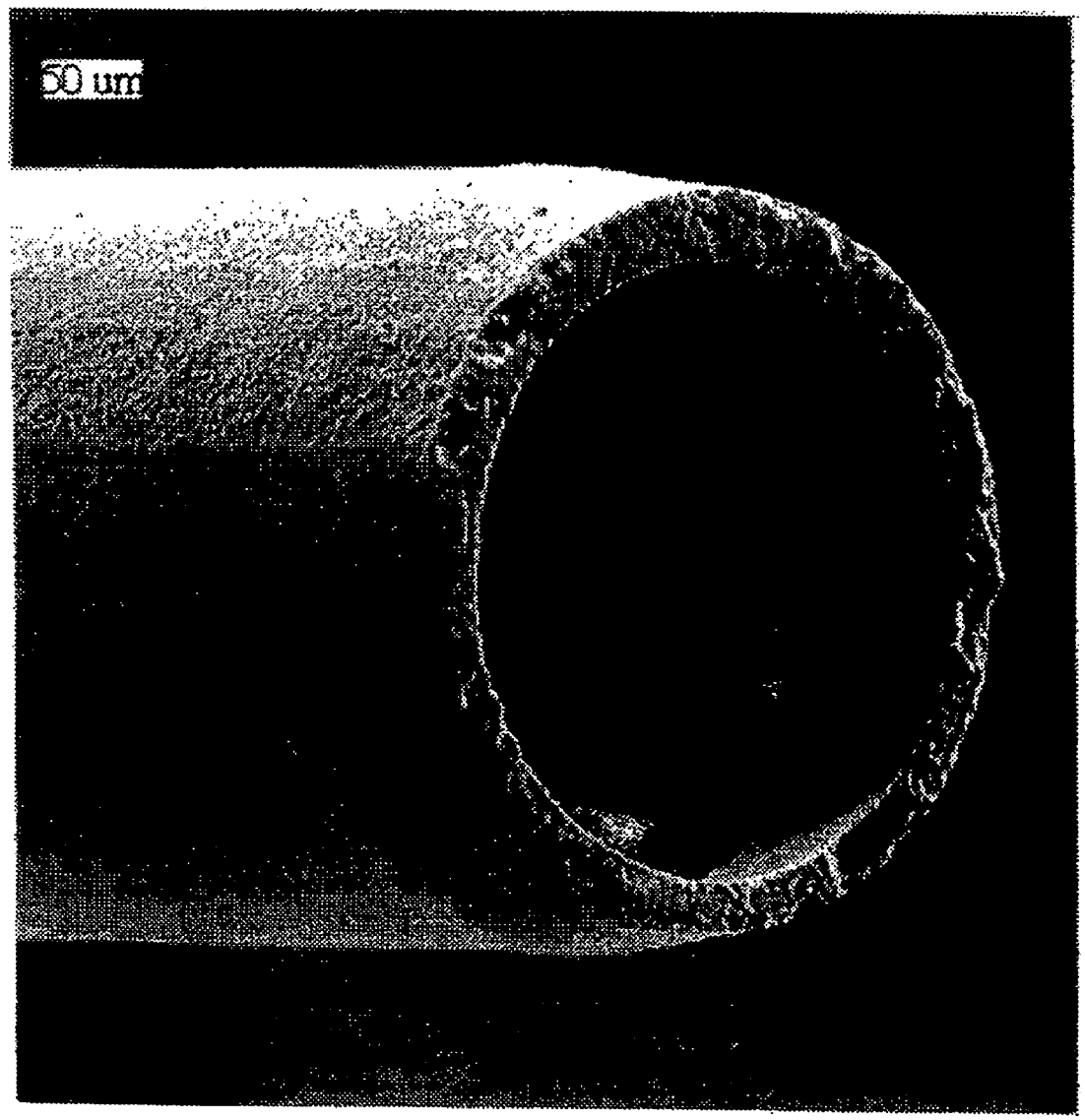
FIG. 11 is a low magnification (170×) scanning electron micrograph of the distal optic array end surface that has been chemically etched and where the silicon resin jacket has not been removed.
Figure 12:
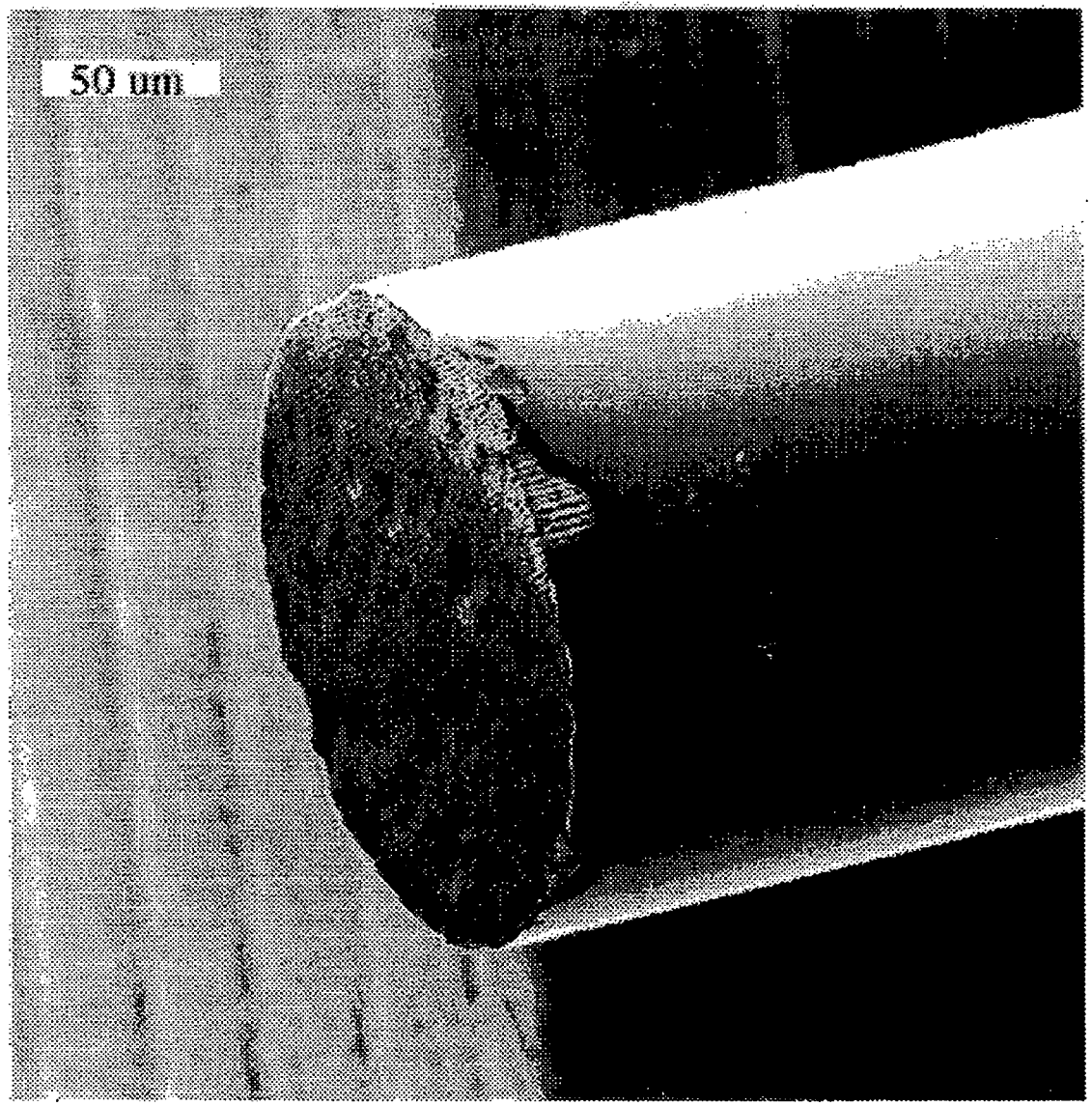
FIG. 12 is a low magnification (200×) scanning electron micrograph of the distal optic array end surface that has been chemically etched and where the silicon resin jacket has been removed.

FIGS. 11–14 illustrate the etching technique's tapering effect on the distal array end surface of the fiber optic array of FIG. 4. FIG. 11 provides a 170 times magnification scanning electron micrograph of an optical fiber array end surface which has been chemically etched by buffered hydrofluoric acid and wherein the silicone resin jacket of the array has not been removed prior to etching. In comparison, FIG. 12 shows a 200 times magnification scanning electron micrograph of the distal optic array end surface, which also has been chemically etched by buffered hydrofluoric acid and where the silicone resin jacket has been removed by acetone. Both the jacketed and non-jacketed formats are available to the ultimate user as a matter of personal choice or convenience.

Figure 13:
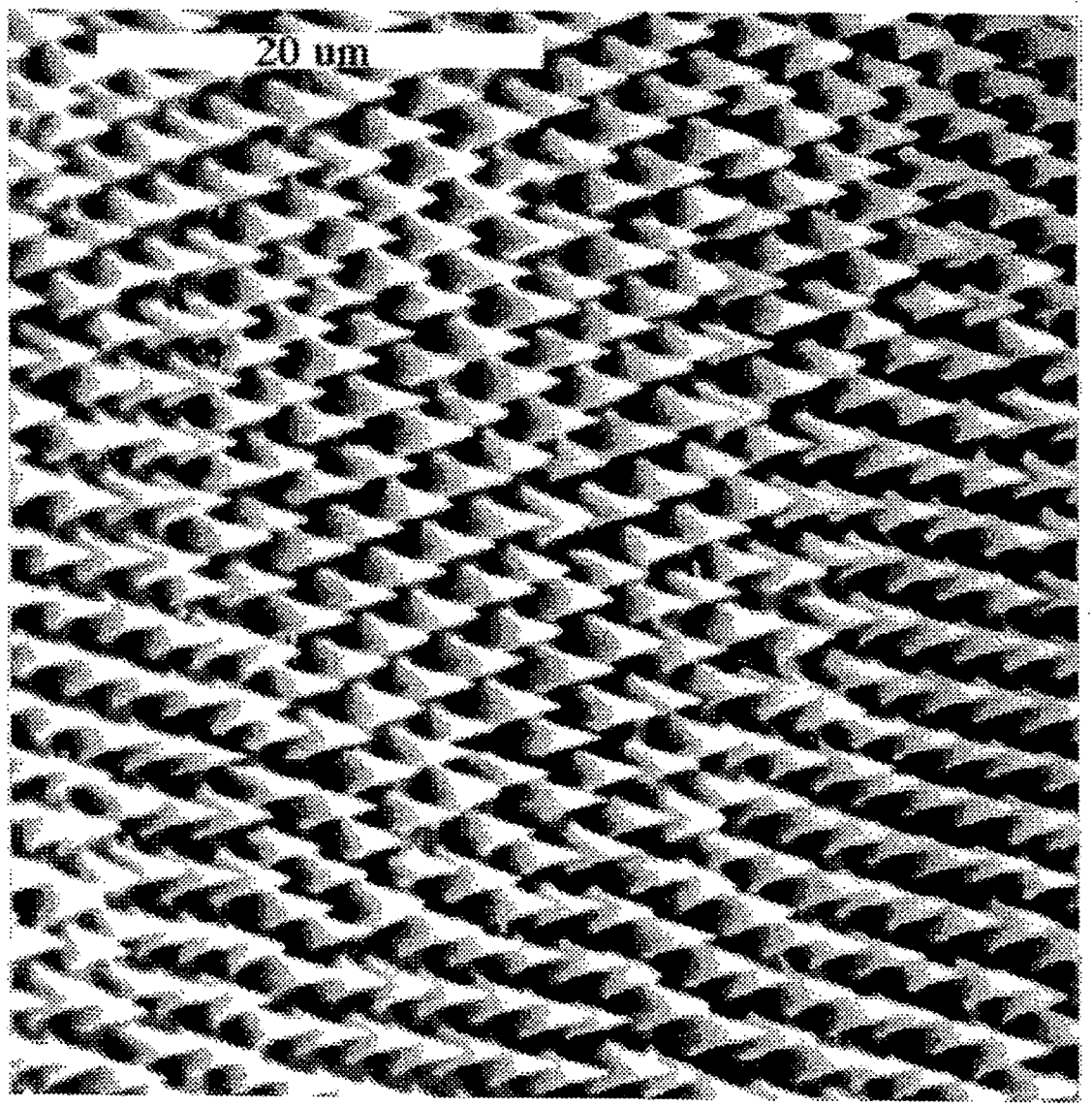
FIG. 13 is a high magnification (1,600×) scanning electron micrograph of a distal optic array end surface that has been chemically etched.

The faceted grid format of the chemically etched optic array end surface is shown in detail by FIG. 13 in which a 1600 times magnification scanning electron micrograph of the chemically etched end surface is shown. Note that each sharply tapered strand end appears as a cladless tapered tip end face individually and repeatedly over the entire array end surface. The size scale provided within FIG. 13 also shows that each cladless tapered tip strand end is markedly reduced in size.

Figure 14:
FIG. 14 is a high magnification (5,00033 ) scanning electron micrograph of a distal optic array end surface that has been chemically etched.
Figure 15:
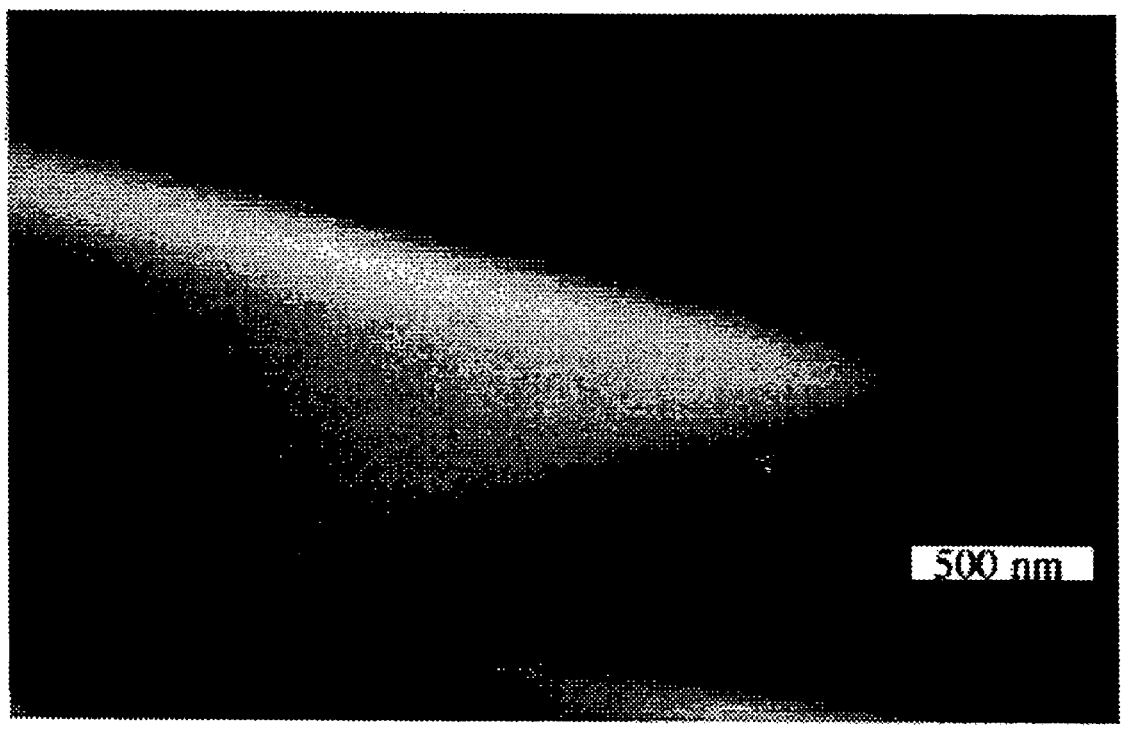
FIG. 15 is a high magnification (30,000×) scanning electron micrograph of a distal optic array end surface that has been chemically etched.

The limited diameter size of each cladless tapered strand end tip fixed in parallel alignment and forming the distal array end surface is shown by FIG. 14 and FIG. 15 respectively. FIG. 14 is a 5000 times magnification scanning electron micrograph of the sharply pointed and cladless, tapered tip end faces of the chemically etched optical fiber strand cores that cumulatively and collectively form the faceted grid optic array end surface at the distal end. A size guide approximation reveals that the cladless, sharply pointed tapered tip end of each optical fiber strand now lies well within a range of 2–1,000 nm. The diameter size of the cladless, tapered strand end tip is illustrated by FIG. 15, which shows a 30,000 times magnification scanning electron micrograph of a single tapered optical fiber strand end which has been chemically etched to yield a cladless and sharply tapered tip end face for the strand. The size guide provided within FIG. 15 clearly reveals the extraordinarily small diameter of the cladless, tapered tip end for each optical fiber strand at the distal array end surface.

2. The Fiber Heating and Pulling Technique and Fiber Etching Technique in Combination The preformed unitary fiber optic array of FIGS. 4–7 can be reduced in thickness at the designated "distal" end by simultaneously heating and pulling the strands axially at one optic array end. Heating of the optic array end is typically and conventionally accomplished using a metal filament, an electric arc, or a carbon-dioxide laser (see, e.g., Valaskovic et al., Appl. Optics, 34:1215–1228 (1995); and McCullock et al. Meas. Sci. Tech., 6:1157–1162 (1995)).

The ability to pull and to taper fiber arrays while maintaining the architecture of the strand cores is achieved using a standard glass capillary tube pipette puller, such as the Narishige Model PE-2 (Brown et al., Advanced Micropipette Techniques for Cell Physiology, International Brain Research Organization, Oxford, 1986). For pulled fibers the original overall diameter of the array of optical fiber strands can be reduced from about 1,000 μm to a final diameter at the tapered end was only approximately 5 μm. The diameter of the tapered ends of the optic array end (and, by extension, the diameter of the entire array) can be controlled by polishing, in particular by controlling the length of the fiber length that protrudes from the polishing apparatus (where the tapered array end is first potted in epoxy to protect it during polishing).

Figure 9:
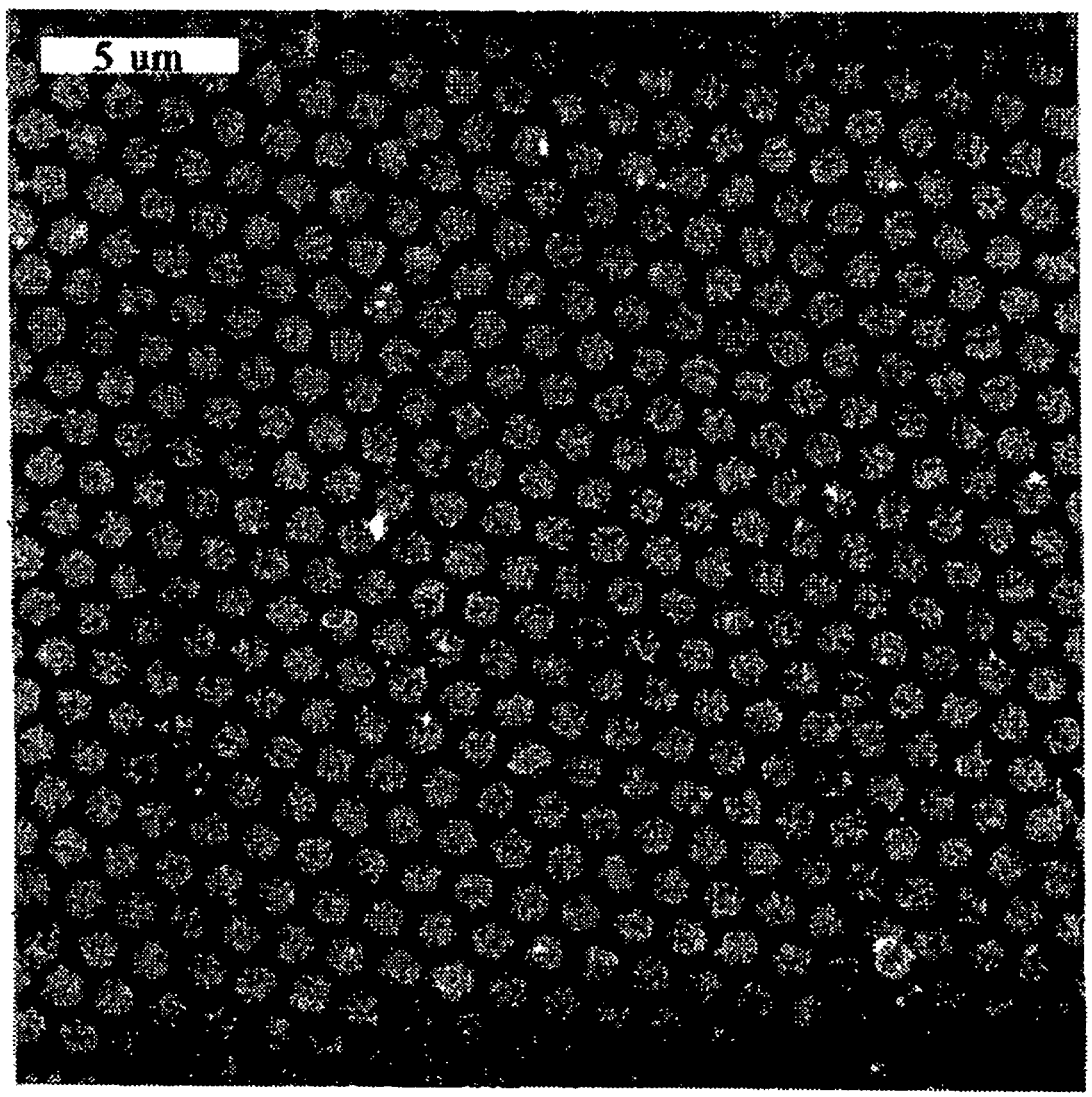
FIG. 9 is a scanning electron micrograph of a polished, non-tapered, distal array end surface where the outer diameter is about 1 mm and the optical fiber strand cores individually are about 2600 nm in diameter.
Figure 10:
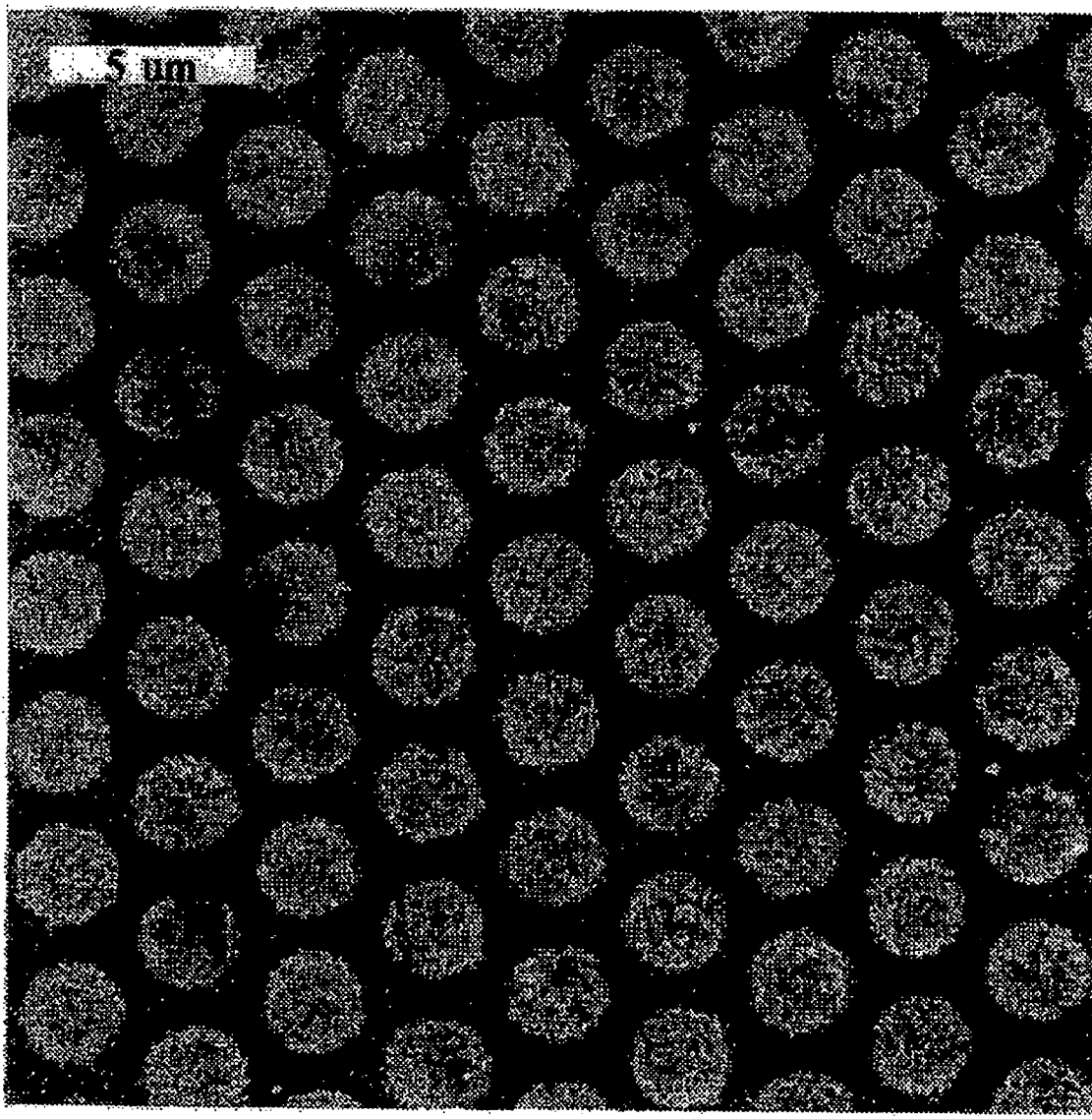
FIG. 10 is a scanning electron micrograph of a polished, tapered distal optic array end surface where the tapered outer array diameter is about 0.325 mm the tapered strand ends individually are about 900 nm in diameter.

The major changes caused by the pulling and heating technique are shown by a comparison of FIGS. 9 and 10. FIG. 9 shows a scanning electron micrograph of a polished non-tapered imaging fiber where the original diameter of the imaging fiber bundle was about 1,000 μm and the diameter of individual strands within the bundle was about 2.6 μm. In comparison, FIG. 10 shows a scanning electron micrograph of a polished, tapered imaging fiber where the diameter of the tapered end face of the array was reduced to about 325 μm and the diameter of the individual optical fiber strands individually was about 900 nm. In both figures, the lighter regions are the cores of the individual optical fibers and the darker regions are the cladding material of the individual fibers. In comparing FIGS. 9 and 10, it is apparent that the tapering procedure yielded not only an imaging fiber array whose tapered end tip was about 3 times smaller than the original size, but also the result that the diameters of the cladded optical fiber strands comprising the imaging fiber array were also scaled back in a uniform manner by a factor of 3. Furthermore, note that the hexagonal packing architecture of the individually-cladded optical fibers within the array was not altered by or modified by the pulling and heating procedure.

It is also noteworthy that the tapered strand end faces shown in FIG. 10 are substantially flat-ended, remain cladded to the very tip of the strand end face, and provide a substantially planar tapered grid optic array end surface wherein each tapered strand end is limited in size to the range between 2–1000 nm in diameter. The physical appearance and format of this pulled and heated tapered array end stands in marked contrast to that illustrated by FIGS. 4 and 7 respectively in the initial workpiece.

One method for tapering the "distal" optic array end employs both the pulling and heating method and the etching method used together in series. The fiber pulling and heating procedure described in detail above tapers the strand end face of the array while maintaining the architecture of the individual strand cores, and while the overall diameter of the array end becomes substantially reduced in thickness and tapered at the tip. A typical tapering effect provides more than a 99% reduction in the diameter of the tip. For example, where the initial overall array diameter is initially about 1,000 $\mu$m, the resulting pulled and heated tapered diameter for the array end was only about 5 $\mu$m in size. FIG. 8 shows a scanning electron micrograph of an array of fiber strands that have been polished and then chemically etched to form tapered tips at the ends of the individual fibers. However, the fibers shown in FIG. 8 have not been pulled to reduce the diameter of the fiber bundle or the individual fibers of the bundle.

Consequently, the etching technique and effect on the previously heated and pulled tapered array end will further reduce the thickness of each individual optical fiber strand end as well as further taper the strand end face such that a sharply tapered, pointed strand end tip is produced. The etching techniques will thus yield the faceted grid optic array end described herein; and produce tapered tip end faces which are sharply pointed and diminished in size to the range of about 2–1,000 nm in diameter. In addition, the center-to-center spacing between the tips (the pitch) is greatly reduced.

The combination of both the pulling/heating technique and the etching procedure together not only provides the benefits and advantages of each tapering process individually, but also offers the manufacturer a far greater degree of tapering control and diameter size selection during the acts of reducing the overall diameter and shaping the optical array end surface into tapered form. In this manner, the desired physical appearance and organizational format for the targeted optic array end will be achieved in a reproducible and reliable process.

V. Applying an Opaque Metal Aperture Coating to the Tapered Ends of the Fibers

An opaque metal coating can be applied to the tapered "distal" end of the optic array to cover all but the very ends of the tapered fiber optic tips. In particular, a metal coating can be applied to the cladless, tapered optical fiber strand end faces. Then, a polymer layer is applied to the metal coating, except at the apexes of the optical fiber tips. The metal layer at the apexes, which is not covered by the polymer layer, is then etched away by an etchant. The etchant does not affect the metal layer that is covered by the polymer layer. Thus, the process creates a plurality of open-ended opaque metal tubes, each having a size-limited end aperture at the apex of the tip that can range from about 2 nanometers to less than about 1,000 nanometers in diameter, depending on how much the fiber bundle was tapered and how fine a tip was etched on the end of the individual fiber strands. This process results in an opaque metal coating shaped like an open-ended opaque metal tube or casing that encompasses and encloses each cladless tapered strand end face and provides subwavelength-sized aperture (ranging from about 2–1,000 nanometers) at the distal end of the fiber array.

The subwavelength-sized apertures enable the generation of a plurality of discrete subwavelength light energy beams concurrently through the multiple cladless tapered strand faces of the distal tapered optic array end. Thus, when light energy is injected into the proximal array surface, it is conveyed by the body of the unitary optic array and is discharged through the multiple cladless tapered strand end faces at the distal tapered optic array end surface. The opaque metal tubular apertures ensure that the existing light beams have a near-field diameter of about 2 nm to less than about 1,000 nm. In this manner, many discrete subwavelength light beams are concurrently generated and collectively discharged by the tapered optical strand end faces through the opaque metal tubular coatings over the entire distal optic array end surface.

A. The Presence of the Opaque Metal Coating Overlay

The physical presence and tangible result of overlaying the "distal" tapered optic array end surface and the cladless, tapered strand end faces individually is most easily demonstrated by coating the sharply pointed, tapered strand end tips of FIGS. 13 and 14 with an opaque metal overlay.

Figure 17B:
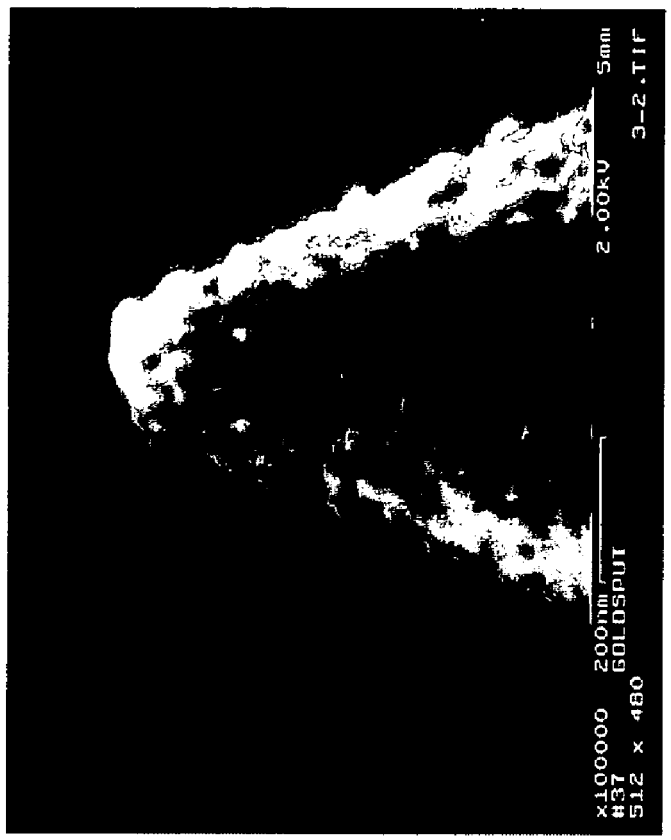
FIGS. 17A and 17B are high magnification scanning electron micrographs of the tip of a tapered optical fiber at the distal optic array end surface having a metal coating applied to the tip.
Figure 17A:
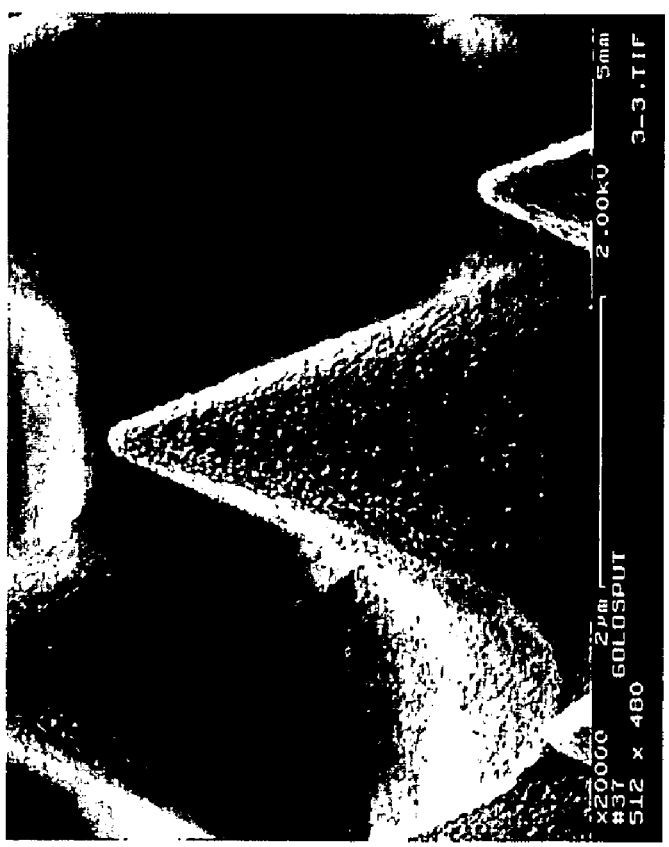
Figure 18B:
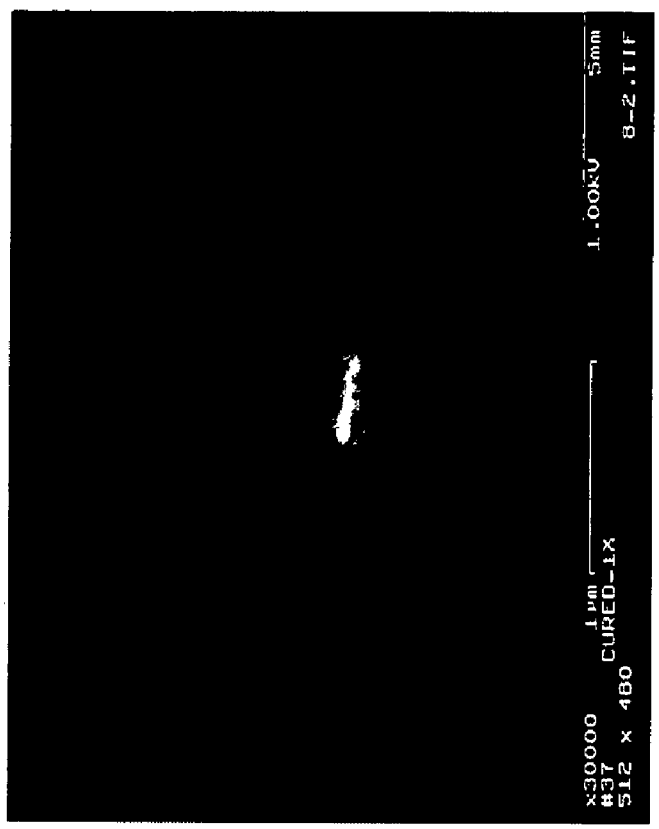
FIGS. 18A and 18B are high magnification scanning electron micographs of a distal optic array end surface and a polymer coating applied to a portion of the metal coating.
Figure 18A:
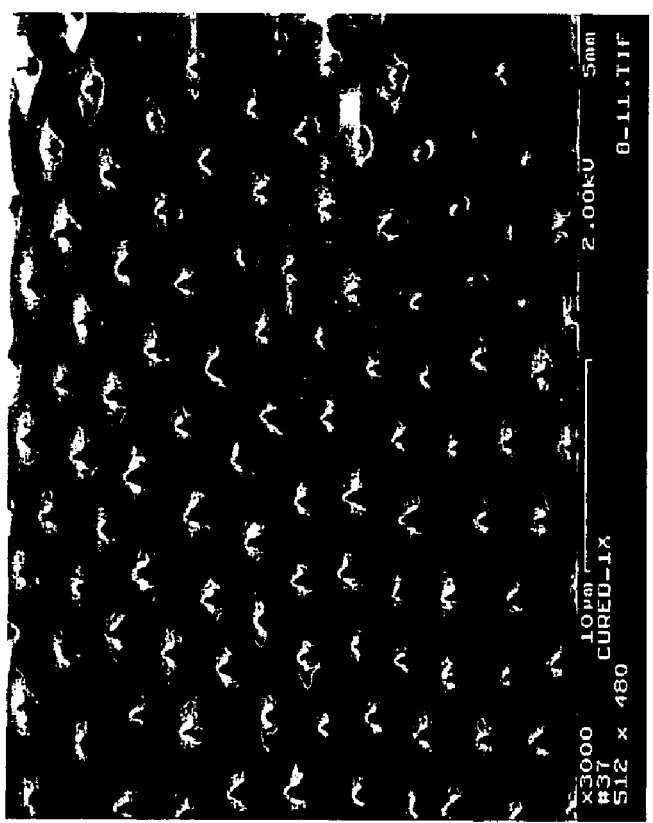

To create apertures at the apex of each tip in the array, gold or other metal is first deposited onto the array as shown in FIGS. 17A and 17B and then removed at the very tip (apex of the tip) of the optical fiber strand to leave a nanometer-sized aperture from which laser light can be emitted. The metal can be deposited by sputter-coating, electron beam evaporation, chemical vapor deposition or any other thin-film deposition technique. The gold layer is applied to block the transmission of light through the array. A polymer layer is then electrodeposited (Slevin et al., Electrochem. Comm., 1:282–288 (1999)) onto the array and subsequently shrunk in a high temperature oven. Each tip in the array is then left with exposed gold at its apex as shown in FIG. 18. The metal is subsequentlyetched away using an etching solution, leaving a nano-aperture. The metal at the apexes of the tips can also be polished to remove metal to create the apertures. Metals other than gold can also be used to form the nano-apertures, for example, aluminum, and copper.

Aluminum, chromium, gold, and silver each are suitable for use as opaque metal coatings. Aluminum has the highest opacity of all metals across the visible spectrum. Typically, aluminum is evaporated as a thin film greater than 50 nm in thickness. This is achieved by placing an aluminum-based target and the tapered strand end surface of the array in a high vacuum chamber and heating the aluminum-based material at low pressure. If a sub-$\lambda$/2-aperture is to be formed, the application of an opaque metal coating that covers the walls of an individual tapered strand end tip (and not the apex of the tip) can be achieved by rotating and shadowing the tip from the evaporating metal target. In other words, when the strand end tip is tilted away from the metal coating source, it is shielded. Of course, if one tilted an array of tapered, cladless strand end tips away from a source of coating metal, each individual tapered strand end tip would prevent the opaque metal coating from covering the walls of neighboring tips. Therefore, formation of size-limited end apertures on each tapered tip of an array typically requires multiple fabrication steps. First, the array of optical tips would be positioned normal to the evaporating metal target such that all cladless, tapered strand end tips would be uniformly coated with aluminum. Second, one of several possible methods to remove the aluminum from the apex of each coated end tip in the array would be employed to create the apertured metal tube coating.

The simplest method to remove aluminum from the apex of each tapered strand end tip in the optic array end would involve deforming the metal coating at the apex by using a piezoelectric device to press the tips of the near-field array against an optically-flat surface. This technique is conventionally known and has been reported in the literature (Pohl, D. W. in Advanced in Optical and Electron Microscopy, (Mulvey, T. and C. J. R. Sheppard, editors), Academic Press, 1991, pp. 243–312; Pohl et al., Appl Phys. Lett., 44:651–653 (1984)). The removal process would be monitored by continuously shining a laser light through the proximal end of the imaging fiber and using an optical microscope equipped with a charge coupled device to look for an array of tiny weak spots of light to be transmitted.

Moreover, other suitable removal processes can involve the following: the lithographic capabilities of a commercial atomic force microscope instrument; a piezoelectric device to lower the tip of the near-field array into a slurry of polishing material; a chemically-assisted (typically a gaseous mixture) polishing procedure; a selective wet chemical etching reaction; and a selective electrochemically-generated reaction (where selective electrochemical etching at the apex would be guaranteed by the increased current density due to spherical diffusion observed at a submicrometer-sized tip) (see for example Datta, M., Interface, 4:32–35 (1995)). Nevertheless, in each of these alternative instances, the actual dimensions of the apertures could be characterized via scanning tunneling microscopy and/or scanning electron microscopy where in both instances the lack of conductivity of the apertures (relative to the portion of each tip covered with the conductive metal coating) would be used to determine the dimensions of the apertures. Atomic force microscopy (AFM) can also be used to characterize the tips. Specifically, surface potential imaging can be used to measure the effective surface voltage of the sample by adjusting the voltage on the AFM tip such that the AFM tip feels a minimum electric force from the sample it is imaging.

Figure 16:
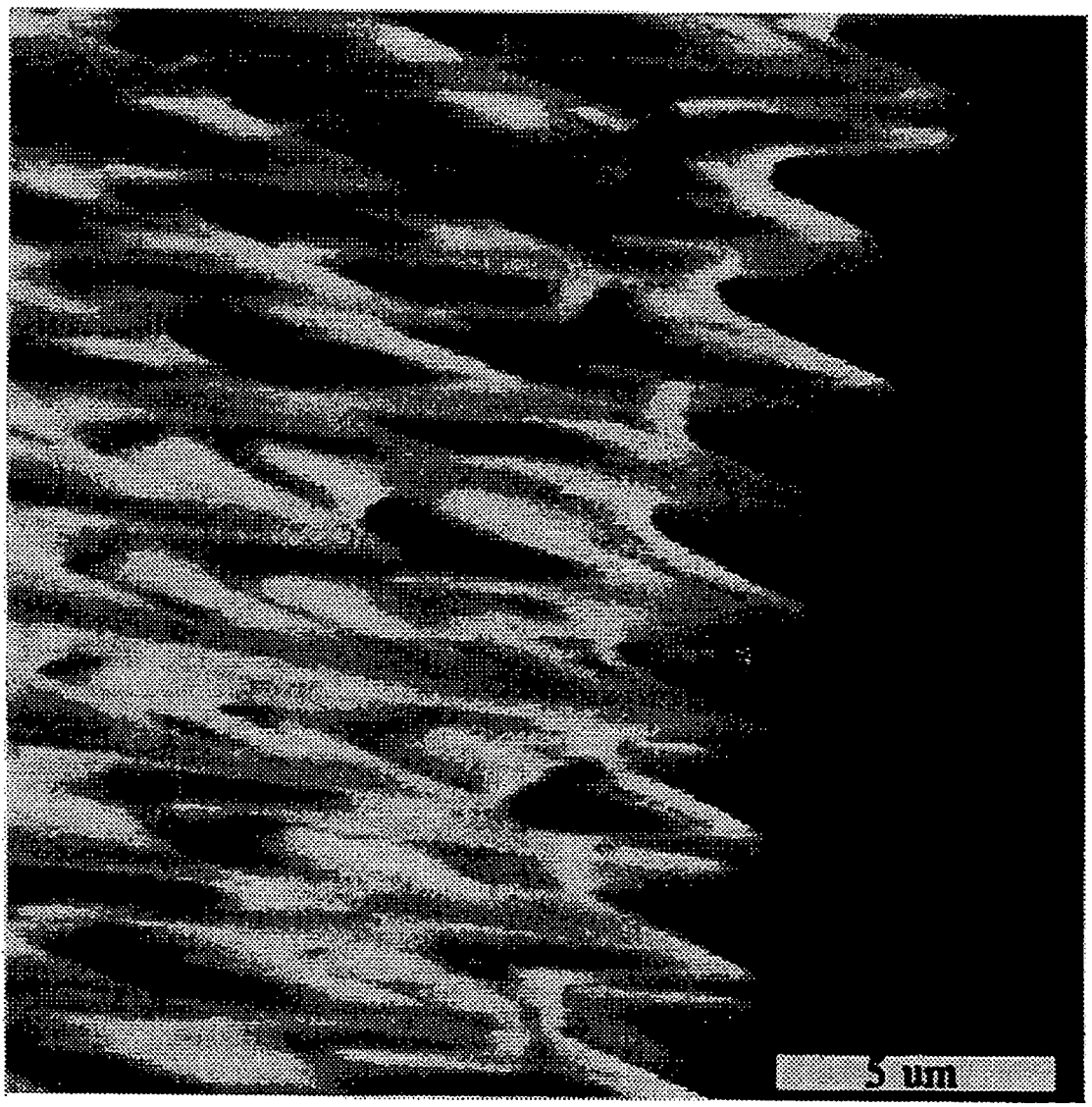
FIG. 16 is a high magnification (3,400×) scanning electron micrograph of a distal optic array end surface that has been chemically etched and coated with a thin layer of aluminum.

The effect and consequence is shown by FIG. 16, which is a 3,400× magnification electron micrograph of a tapered distal optic array end surface that has been chemically etched to yield sharply pointed tapered strand end tips and subsequently evaporation-coated with a thin aluminum layer to form nano-apertures at the ends of the optical fiber strands. Note that there was no additional gold-coating necessary to produce this particular scanning electron microscope analysis and in the taking of this micrograph image. This is an important point to appreciate because when any silica-based optical fiber strand or fiber optic array is subjected to the 15 keV electron beam without the prior application of a metal coating, either an image is not obtainable at all and/or the electron beam begins to damage and degrade the substance of the fiber optical strands themselves. Thus, the fact that an electron micrograph image can be acquired for an aluminum-coated chemically etched optical array end surface (as shown in FIG. 16) demonstrates that a uniform and continuous metal overlay extends across the entire distal array end tapered surface and also that this metal overlay covers the configured side walls of the fiber optic array as a contiguous aluminum coating (to join and merge with the grounded-sample-mounting stub).

In addition, the size guide provided in FIG. 16 reveals that the overall size range for the open-ended opaque tubes or metal casings overlaying the tapered strand end faces at the distal array end surface is about 10 nm. The achieved result and consequence of the aluminum metal overlay is that opaque metal tubes encompass and enclose each cladless, tapered strand end face.

B. The Positioning of the end Aperture of the Opaque Overlay on the Tapered Strand end Faces The process of overlaying each cladless, tapered strand end face with an opaque metal coating material to form an open-ended tube or casing having a size limited end aperture can be achieved using different structural formats and positionings. This can be understood and demonstrated by using the sharply pointed, tapered strand end tip of FIG. 15 as a prototype and teaching example.

The overlying of the cladless tapered strand end face of FIG. 15 with an opaque metal coating material can result in three different physical positionings for the open-ended opaque metal enclosures subsequently formed, wherein each tubular end aperture is limited in size to the range from about 2 nm to less than about 1,000 nm in diameter. These three positioning formats are illustrated by FIGS. 19a, 19b, and 19c.

Figure 19A:
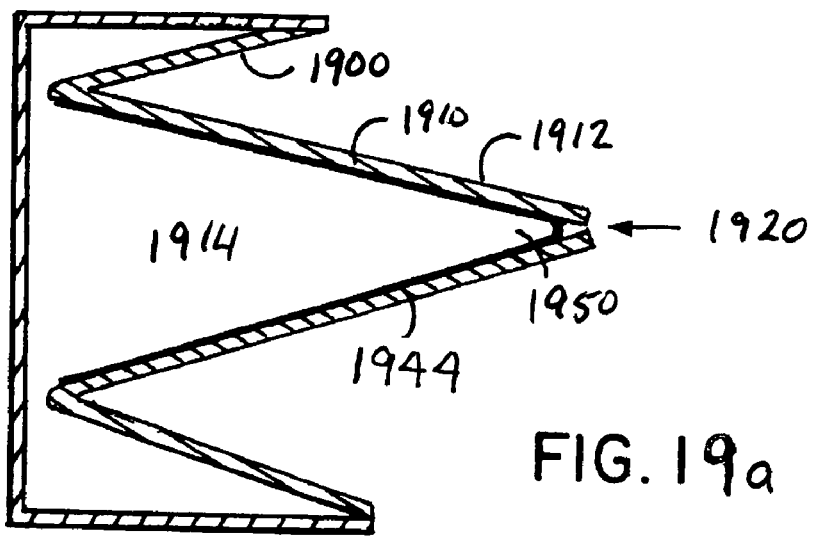
FIGS. 19A, 19B and 19C are cross-sectioned views of a chemically-etched, tapered optical fiber strand end that has been overlayed with an opaque metal coating in a second alternative positional format.

As seen in FIG. 19a, the opaque metal coating material 1900 forms a funnel-shaped tube 1910 whose cross-sectional sides 1912 and 1944 extend beyond the sharply pointed tapered tip end 1950 and form an extremely narrow diameter aperture 1920 (typically in the range from about 2–20 nanometers). The overall axial length of the open-ended opaque metal tube 1910 and the side wall 1912 and 1944, which extend markedly beyond the end of the cladless tapered strand tip 1950, that allows for the extremely narrow diameter of the aperture 1920. If, however, the axial length of the tubular enclosure 1910 is reduced during the coating process or shortened after the opaque metal coating material has hardened as a open-ended tube, an alternative positioning and organizational format results.

Figure 19B:
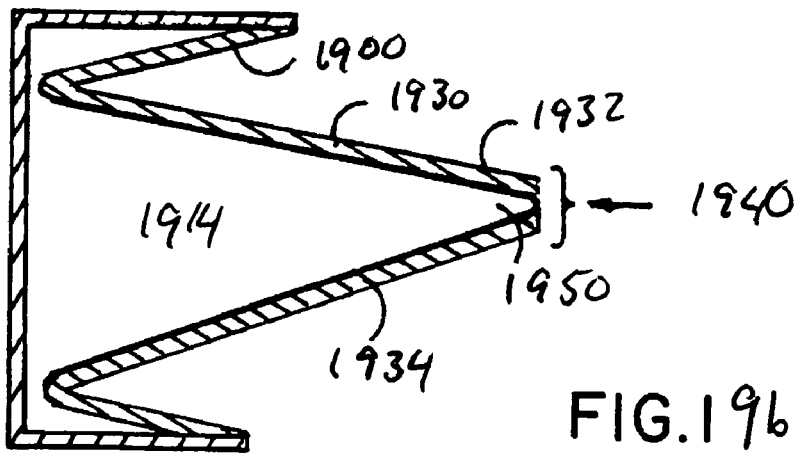

The shortened opaque metal coating tube 1930 is illustrated by FIG. 19b in which the "V"-shaped casing 1930 has shortened side walls 1932 and 1934, which results in a size-limited end aperture 1940 which surrounds the perimeter of the tapered strand end face 1950 and provides an aperture size very similar in diameter to the size of the sharply pointed and cladless, tapered strand end tip 1950. In this manner and second positioning format, the aperture size 1940 for the opaque metal casing 1930 corresponds to and is strikingly similar in size to the diameter of the sharply pointed, tapered strand end face 1950, and consequently the near-field spot size of the subwavelength light beam emitted is broader (typically between 3–200 nanometers in diameter).

Figure 19C:
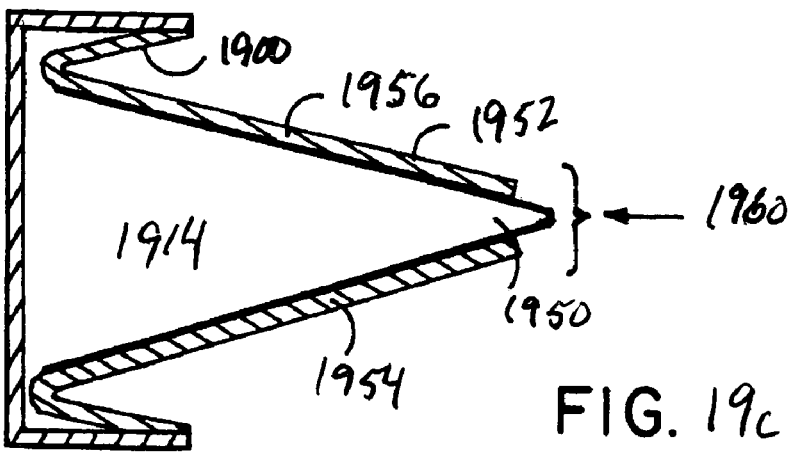

The third positioning format is illustrated by FIG. 19c. As seen therein, the opaque metal coating material 1900 forms another cone-shaped hollow overlay 1956 and provides an open-ended enclosure with a size limited end aperture within the prescribed size range. However, the opaque metal side walls 1952 and 1954 are relatively short in axial length and terminate on the tapered strand end 1914 short of the cladless and sharply pointed, tapered tip end face 1950. Accordingly, in this third instance, the sharply pointed, tapered tip strand end 1960 extends through and beyond the opaque metal overlay enclosure 1956 and extends through the sized aperture 1960 into the ambient environment. As a result of this organizational format and positioning for the opaque metal overlay coating 1956, the end aperture 1960 is actually greater in overall size than the diameter of the tapered strand end face 1950. Thus, while the diameter of the tapered strand end face 1950 has remained constant throughout each illustration and embodiment provided by FIGS. 19a, 19b, and 19c, the size-limited end aperture 1960 in metal coating 1950 shown in FIG. 19c is markedly greater in size than the size-limited end aperture 1920 in metal coating 1950 shown in FIG. 19a.

VI. Reading and Writing Data in Parallel with the Array

Figure 20:
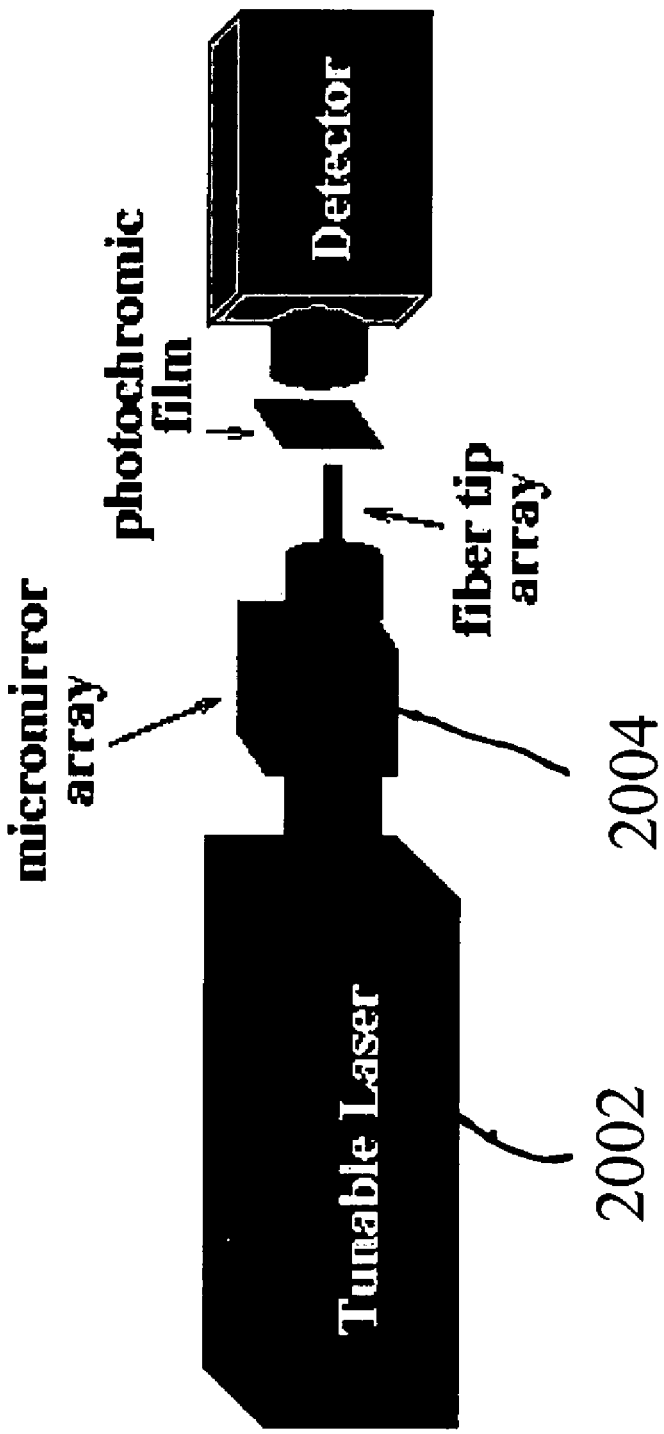
FIG. 20 is a schematic view of an apparatus for optically reading and writing data with a high-density array of near-field optical fiber.

As shown in FIG. 20, a high density optical storage device using an imaging fiber-based near-field array is formed by coupling a tunable, continuous wave ("cw") laser 2002 into a fiber optic imaging bundle though a micromirror array 2004. To selectively write with particular tips within the near-field tip array, a device is used that transmits laser light to selected individual fiber strands at the proximal end. As an example, a mirror array (e.g., Texas Instruments DMD micromirror array device) can be used. This device is composed of an array of tilted mirrors where each mirror can be mechanically controlled to either switch on, with reflection of light, or switch off, with no reflection of light. A one-to-one mapping of mirrors in the mirror array to optical fiber strands of the fiber array exists, and thus a one-to-one mapping exists between the mirrors and the read/write heads. Individual mirrors of the micromirror array can be positioned to either direct light into the proximal end of a fiber strand or to direct light away from the strand, which controls the writing of data on the photochromic film.

The laser beam emitted from laser 2002 is directed into the micromirror array 2004 and illuminates all mirrors in the mirror array. Each mirror in the array can reflect laser light into a particular fiber in the array. By switching a mirror between an "on" and "off" position, the emission of laser light from each individual fiber tip in the array can be controlled, thereby controlling writing and reading data on the storage medium.

Figure 21:
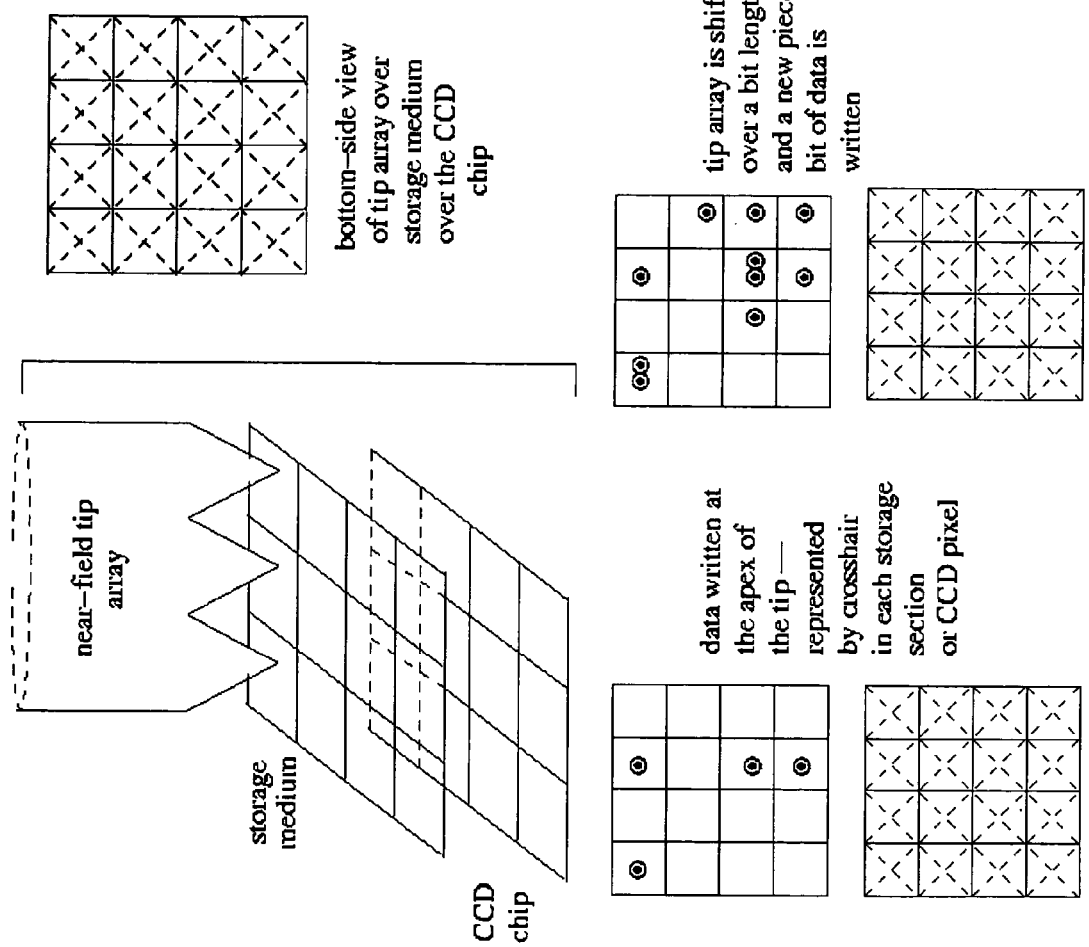
FIG. 21 is a schematic view of an apparatus for optically reading and writing data with a high-density array of near-field optical fiber.

Referring to FIG. 21, data can be written in a highly parallel manner by writing simultaneously with multiple fiber stands of the array. The data are organized geometrically by associating each fiber strand in the fiber bundle with a section of the photochromic film just above an individual CCD chip pixel. Thus, if a 100,000 aperture array is employed, 100,000 CCD pixels would be used, and up to 100,000 bits of data could be written and read simultaneously. Because the diameter of a spot written by a near-field tip is much smaller than the diameter of an the untapered portion of the optical fiber, more than one bit of data can be stored on each section of the film associated with an optical fiber. For example, if 10,000 bits can be written on each section and the array contains 100,000 optical fibers, then 1 gigabit of data can be stored with the array.

The near-field tip of each fiber strand can be used to write multiple times to different parts of the portion of the photochromic film just above the CCD pixel associated with the fiber strand. After a near-field tip array is brought into proximity to the photochromic medium, light of a specific wavelength is introduced to pre-selected fibers by selectively positioning the individual mirrors of the array to write bits of information whose feature sizes are determined by the size of the apertures on the near-field tips. The array is then moved a distance slightly more than the width of one near-field tip (one "bit width") to a new location to position each of the near-field tips over a new portion of the film associated with each section. Then another write operation is performed with a new set of pre-selected fibers. This process can be continued until all regions of all sections of the film are recorded. In other words, multiple write operations can be executed within a single CCD pixel, which has a diameter approximately equal to the area of the optical fiber. The near-field tip array can be mounted on a precise, piezo-type motor and can be computer controlled. The writing process, shown in FIG. 21, can be continued until the entire area on the photochromic storage area has been addressed.

Data can be read in a similar parallel method. After the near-field tip array is brought into proximity to the photochromic storage medium, light of a specific wavelength different from the wavelength used for writing is shined into all the individual optical fibers of the bundle (use of the mirror array is optional when reading data bits, because all individual fibers are illuminated at the same time). For a storage region mapped to a particular CCD pixel, bits in one state will have a different optical signal from bits in another state. The CCD pixel will record this information, and the two information states can be distinguished based on their optical signals. Because the CCD pixels can record information separately from each other, a 100,000 fiber array is able to read 100,000 bits at a time. The fiber array is then moved to the next bit position to read the next 100,000 bits of information, and the process repeats and can continue until all the information on the entire storage medium has been read. Each individual optical fiber of the bundle can be associated with one CCD pixel, such that all data bits illuminated by a particular optical fiber are read out as data by a particular pixel of the CCD. Although the detector has been described as a CCD detector, other light detectors can also be used, for example, a CMOS or avalanche photodiode (APD) array. It should be noted that every fiber in the array is simultaneously illuminated to read all the bits on the photochromic film that align with the fiber array.

Thus, a high density optical storage device using an imaging fiber-based near-field tip array coupled with CCD detection can be used to write and read a highly dense amount of information on a storage medium in a parallel fashion. The mapping of one optical fiber to one detector pixel, where each fiber can write thousands of data bits enables a limited number of fibers and a limited number of detectors to scale to very high numbers of bits. In this manner, a detector array is used to read all the data bits written on the film above it, by tracking the position of the optical fibers in the fiber bundle, and a single pixel of the detector is matched to the position of many data bits. The detector read cycle is a combination of parallel reads of the number of bits interrogated simultaneously by all the fibers in the array multiplied by the number of serial reads performed by raster scanning of the fiber within the film area associated with each detector pixel.

Imaging fiber bundles are easily obtained from commercial resources, and the near-field tip array is easily fabricated from these bundles. Consequently, an optical read/write head using a near-field tip array is a cost-effective, high-density, precisely formed component. The device also has a minimal number of optical components, resulting in a simple setup, low cost, and ease in maintenance. All the components of the optical storage system, tunable continuous-wave laser, micromirror array device, and inverted microscope, are common optical devices easily obtainable from commercial sources.

EXAMPLES

The following examples are illustrative, and are not intended to limit the devices and methods described herein.

A. Silica-Based Fiber Array

The high density, high resolution, silica-based, preformed unitary fiber optic array used in this method was obtained from Sumitomo Electric Industries (Torrance, Calif.) and comprised about 6,000 individually-cladded optical fibers that were arranged coherently in a about 270 μm-internal diameter silica jacket. The walls of this silica jacket were about 15 μm thick and were coated with a 25 μm-thick layer of silicone resin in order to preserve mechanical strength. As a result, the total diameter of the imaging fiber was about 350 μm. The individual optical fiber cores had a diameter of 2–3 μm and were fabricated from silica ($SiO_2$) doped with $GeO_2$. The lower refractive index cladding material was fabricated from $SiO_2$ doped with fluoride.

B. Selective-Chemical Etching Procedure

In this selective chemical etching procedure, the difference in the etching rates of the $GeO_2$-doped silica core and the fluoride-doped silica clad is exploited by using a buffered hydrofluoric acid etching solution comprising 100 μL of 50% hydrofluoric acid (Fisher Chemical Co.), 100 μL of water, and 500 μL of 40% ammonium fluoride (Aldrich Chemical Co.). (CAUTION: appropriate safety measures should be used (i.e., protective gloves and clothing, safety glasses, etc.).)

The first step involves successive polishing of the distal and proximal faces of a 1950 μm-diameter fiber optic array with 30 μm, 15 μm, 3 μm and 0.3 μm lapping films. Residual polishing material is removed by wiping the faces of the imaging fiber with an acetone-soaked cotton swab and then sonicating in deionized water. The tip of the distal end face of the imaging fiber is then dipped (at a right angle) into the buffered hydrofluoric acid etching solution for a given amount of time (0.5–24 hours), such that each fiber in the bundle is etched to form a 3 μm tall tip as shown in FIG. 8. The etching solution comprised 0.2 g $NH_4F$, 100 mL of 48% HF solution, 100 mL of acetic acid, and 600 mL of deionized water. The distal end face of the imaging fiber was then thoroughly rinsed and sonicated in water. Finally, the silicone resin jacket surrounding the distal end face of the array was removed by soaking the array end surface in acetone for 1–2 days.

Analysis of the etched fiber optic array end surface was conducted with a scanning electron microscope. FIG. 11 shows a low magnification electron micrograph of a fiber optic array surface that has been chemically etched before the silicone resin was removed; and FIGS. 7 and 12 show a low magnification electron micrograph of a chemically-etched optic array end surface where the silicone resin jacket was removed. If the silicone resin was removed before the etching procedure, the silica jacket would also be etched and thus the 270 μm diameter of the array would be reduced. FIGS. 13–15 show high magnification electron micrographs of a chemically-etched strand array end surface. Notice that the cladding material that surrounds each individual optical fiber has been removed and that the strand end tips of each optical fiber strand are now tapered with tip diameters on the order of 100–200 nm. Atomic force microscopic analysis of these arrays has demonstrated that the cladless, tapered strand end tip diameters are less than about 100 nm.

C. Opaque Metal Overlay

Aluminum was then evaporated as a thin film overlay in a depth (or thickness) greater than about 50 nm. After the aluminum coating has hardened into a solid continuous overlay, the size-limited aperture within the prescribed range (2–1,000 nm) was formed by removing aluminum metal from the apex of each tapered end tip at the optic array end using a piezoelectric apparatus to process the end tips against an optically flat surface. This results in a deformation of the aluminum metal coating at the apex and creates the size-limited apertures as required.

Alternatively, the near-field tip array can be sputter coated (Fisons Instruments, Polaron SC502) with a 400 Å layer of gold as shown in FIGS. 17A and 17B. A thin film of polymer was then electrodeposited onto the fiber bundle using potentiostat (AutoLab Potentiostat PGSTAT30) with potential of 2V and a Pt wire counter electrode. The fiber array was then put into an oven at 160° C. for 5 minutes which shrunk the polymer layer, exposing only the gold apices of each tip as shown in FIG. 18. The gold was then removed from each tip apex by immersing the fiber array into a 0.2M KCN/0.002 M K3(Fe(CN)6) etching solution.

D. Positioning the Array and Writing the Data

The near-field tip array and photochromic film was mounted on an Olympus IX-81 inverted microscope. A focusing lens (Newport, Irvine, Calif.) was placed in the place of the microscope condenser to focus the laser into the near-field tip array. Data were written onto a photochromic film using 647 nm light from a tunable, continuous wave Coherent Innova 70C Spectrum laser (Coherent Laser Group, Santa Clara, Calif.). An absorption spectrum was recorded using a Beckman Series DU-530 UV-VIS spectrophotometer (Beckman Instruments Inc., Fullerton, Calif.). The near-field tip array was held by a fiber holder connected to a micropositioner (Newport, Irvine, Calif.) that was connected to a microscope stage, which allowed movement in the X, Y, and Z directions. A Cooke Sensicam CCD (Cooke Corporation, Auburn Hills, Mich.) or photographic film (Eastman Kodak Company, Rochester, N.Y.) was used for data detection of the photochromic film.

OTHER EMBODIMENTS

It is to be understood that while a number of embodiments been described in conjunction with the detailed description thereof, the foregoing description is intended to illustrate and not limit the scope of the invention, which is defined by the scope of the appended claims. Therefore, other aspects, advantages, and modifications are within the scope of the following claims.

What is claimed is:

1. A data storage apparatus comprising:
   (1) an array of optical fibers, the array having a first end and a second end, wherein
      (a) the first end of the array comprises multiple optical fiber ends, each optical fiber end having an end face adapted for receiving light of a wavelength λ into the fiber for conveyance to the second end of the fiber array; and
      (b) the second end of the array comprises multiple tapered optical fiber tips, each tapered optical fiber end having a minimum diameter less than λ;
   (2) an opaque coating covering a portion of the tapered optical fiber tips;
   (3) a photochromic medium located within a distance λ of the second end of the array, and
   (4) a means for directing light of the wavelength λ selectively into individual optical fibers of the array at the first end of the array.

2. The apparatus of claim 1, wherein a minimum diameter of the tapered optical fiber tips is between about 2 nm and about 1000 nm.

3. The apparatus of claim 1, wherein a minimum diameter of the tapered optical fiber tips is between about 2 nm and about 300 nm.

4. The apparatus of claim 1, wherein a minimum diameter of the tapered optical fiber tips is between about 2 mn and about 100 nm.

5. The apparatus of claim 1, wherein the opaque coating comprises a metal.

6. The apparatus of claim 5, wherein the metal is selected from the group consisting of gold, aluminum, silver, and chromium.

7. The apparatus of claim 1, wherein optical properties of the photochromic medium are changed when the medium is exposed to light of wavelength $\lambda$.

8. The apparatus of claim 1, further comprising a light detector array positioned such that the photochromic medium is positioned between the light detector array and the array of optical fibers.

9. The apparatus of claim 8, wherein the light detector is a charge-coupled device.

10. The apparatus of claim 8, wherein the light detector comprises pixels.

11. The apparatus of claim 10, wherein each pixel of the light detector is associated with an optical fiber of the array.

12. The apparatus of claim 11, wherein each pixel has an area that is more than 1000 times greater than the area of an associated optical fiber's tapered optical fiber end.

13. The apparatus of claim 1, wherein the means for directing light selectively into individual optical fibers comprises an array of mirrors for directing light into the end faces of the optical fibers, each mirror being located close to the first end of the array.

14. The apparatus of claim 13, wherein each mirror is positioned and adapted to direct light into a different optical fiber of the array.

15. The apparatus of claim 14, wherein the mirrors are movable between a first position for directing light into an optical fiber of the array and a second position for directing light away from the fibers of the array.

16. A data storage apparatus comprising:
   (1) an array of optical fibers, the array having a first end and a second end, wherein
      (a) the first end of the array comprises multiple optical fiber ends, each optical fiber end having an end face adapted for receiving light of a wavelength $\lambda$ into the fiber for conveyance to the second end of the fiber array; and
      (b) the second end of the array comprises multiple tapered optical fiber tips, each tapered optical fiber end having a minimum diameter less than $\lambda$;
   (2) an opaque coating covering a portion of the tapered optical fiber tips;
   (3) a photochromic medium located within a distance $\lambda$ of the second end of the array;
   (4) a laser for generating light of wavelength $\lambda$ and directing such light into the array of optical fibers; and
   (5) a light detector positioned such that the photochromic medium is positioned between the light detector array and the array of optical fibers, wherein the light detector comprises pixels with each pixel being associated with an optical fiber of the array and wherein an area of each pixel is more than about 100 times greater than an area of the associated optical fiber's tapered optical fiber end.

17. The apparatus of claim 16, wherein a minimum diameter of the tapered optical fiber tips is between about 2 nm and about 300 nm.

18. The apparatus of claim 16, wherein a minimum diameter of the tapered optical fiber tips is between about 2 nm and about 100 nm.

19. The apparatus of claim 16, wherein the opaque coating comprises a metal.

20. The apparatus of claim 16, wherein optical properties of the photochromic medium are changed when the medium is exposed to light of wavelength $\lambda$.

21. The apparatus of claim 16, further comprising a light detector array positioned such that the photochromic medium is positioned between the light detector array and the array of optical fibers.

22. The apparatus of claim 21, wherein the light detector is a charge-coupled device.

23. The apparatus of claim 21, wherein the light detector comprises pixels and each pixel of the light detector is associated with an optical fiber of the array.

24. The apparatus of claim 23, wherein each pixel has an area that is more than 1000 times greater than the area of an associated optical fiber's tapered optical fiber end.

25. The apparatus of claim 16, further comprising an array of mirrors for directing light into the end faces of the optical fibers, each mirror being located at the first end of the array.

26. The apparatus of claim 25, wherein each mirror is positioned and adapted to direct light into a different optical fiber of the array.

27. The apparatus of claim 26, wherein the mirrors are movable between a first position for directing light into an optical fiber of the array and a second position for directing light away from the fibers of the array.

28. The apparatus of claim 16, further comprising a translation stage for translating the array from a first position relative to the medium to a second position relative to the medium.

29. A method of optically storing multiple data bits in parallel, the method comprising:
   creating light having a wavelength $\lambda$ ; and
   directing light of wavelength $\lambda$ into first ends of selected individual optical fibers of an array of multiple co-axially arranged optical fiber, such that the light is conveyed to second ends of the optical fibers, from which the light exits and impinges on a photochromic medium whose optical properties can be altered by light of wavelength $\lambda$, wherein the second tapered ends have a minimum diameter less than $\lambda$ and are positioned within a distance $\lambda$ of the photochromic medium.

30. The method of claim 29, further comprising:
   positioning individual mirrors of an array of multiple mirrors, such that first selected individual mirrors direct the light into the first ends of the individual optical fibers and non-selected individual mirrors do not direct light into the first ends; and
   shining light of wavelength $\lambda$ onto the array of multiple mirrors such that the light is reflected by the selected mirrors onto the first ends of individual optical fibers and is conveyed to the second ends of the optical fibers.

31. The method of claim 30, further comprising:
   translating the array of optical fibers substantially parallel to a surface of the medium; and
   again shining light of wavelength $\lambda$ onto the array of multiple mirrors such that the light is reflected by second selected mirrors onto the first ends of individual optical fibers and is conveyed to the second ends of the optical fibers, where the light exits the optical fibers and impinges on the photochromic medium.

32. A method of optically reading multiple data bits in parallel, the method of comprising:

directing light of a first wavelength $\lambda_1$ into multiple first ends of individual optical fibers of an array of multiple co-axially arranged optical fibers, the individual optical fibers having second tapered ends with a minimum diameter less than $\lambda_1$ and being positioned within a distance $\lambda_1$ of a photochromic medium whose optical properties can be altered by light of a second wavelength $\lambda_2$ wherein $\lambda_2$ is not equal to $\lambda_1$;

measuring an optical property of the photochromic medium representing a digital data bit at a location under each of the second tapered ends of the optical fibers; and determining whether each data bit represents a "1" or a "0" based on the measurement of the optical properties.

33. The method of claim 32, wherein the optical property is a transmissivity of the medium.

34. The method of claim 32, further comprising:

translating the array of optical fibers substantially parallel to a surface of the medium;

again directing light of the first wavelength $\lambda_1$ into the first ends of individual optical fibers of the array;

again measuring an optical property of the photochromic medium representing a digital data bit at a location under each of the second tapered ends of the optical fibers; and again determining whether each data bit represents a "1" or a "0" based on the measurement of the optical properties.

* * * * *